US012059609B2

(12) United States Patent
Ye et al.

(10) Patent No.: US 12,059,609 B2
(45) Date of Patent: Aug. 13, 2024

(54) ASYNCHRONOUS DYNAMIC VISION SENSOR LED AI TRACKING SYSTEM AND METHOD

(71) Applicant: Sony Interactive Entertainment Inc., Tokyo (JP)

(72) Inventors: Xiaoyong Ye, South San Francisco, CA (US); Yuichiro Nakamura, Redwood City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/837,932

(22) Filed: Jun. 10, 2022

(65) Prior Publication Data
US 2023/0398432 A1    Dec. 14, 2023

(51) Int. Cl.
A63F 13/211    (2014.01)
A63F 13/213    (2014.01)
G06F 3/03      (2006.01)

(52) U.S. Cl.
CPC .......... *A63F 13/213* (2014.09); *A63F 13/211* (2014.09); *G06F 3/0308* (2013.01); *A63F 2300/105* (2013.01); *A63F 2300/1087* (2013.01)

(58) Field of Classification Search
CPC .................. A63F 13/213; A63F 13/211; A63F 2300/105; A63F 2300/1087; G06F 3/0308
See application file for complete search history.

(56) References Cited

U.S. PATENT DOCUMENTS 8,313,379 B2    11/2012    Ikeda et al.
8,723,794 B2     5/2014    Corson et al.
(Continued)

FOREIGN PATENT DOCUMENTS

EP    3012765 B1    11/2019
EP    3944059 A1     1/2022
(Continued)

OTHER PUBLICATIONS

Neumann et al. "Uncooled IR Sensors with Tunable Fabry-Perot Filters for the Long-Wave Infrared Range" Research Gate, DOI: 10.1109/ICSENS.2010.5690856, Nov. 2010.
(Continued)

*Primary Examiner* — David L Lewis
*Assistant Examiner* — Shauna-Kay Hall
(74) *Attorney, Agent, or Firm* — JDI PATENT; Joshua D. Isenberg; Robert Pullman

(57) ABSTRACT

A tracking system uses a dynamic vision sensor (DVS) operably coupled to the processor. The DVS has an array of light-sensitive elements in a known configuration. The DVS outputs signals corresponding to two or more events at two or more corresponding light-sensitive elements in the array in response to changes in light output from two or more light sources mounted in a known configuration with respect to each other and with respect to a controller. The output signals indicate times of the events and locations of the corresponding light-sensitive elements. The processor determines an association between each event and two or more corresponding light sources and fits a position and orientation of the controller using the determined association, the known configuration of the light sources and the locations of the corresponding light-sensitive elements in the array.

21 Claims, 20 Drawing Sheets

(56) References Cited

U.S. PATENT DOCUMENTS

| | | | |
|---|---|---|---|
| 9,285,893 | B2 | 3/2016 | Holz |
| 10,220,302 | B2 | 3/2019 | Zalewski et al. |
| 10,241,573 | B2 | 3/2019 | Mallinson |
| 10,534,454 | B2 | 1/2020 | Stafford et al. |
| 10,956,724 | B1 * | 3/2021 | Terrano .................. G06V 10/82 |
| 10,956,737 | B1 | 3/2021 | Vakili |
| 2012/0162214 | A1 | 6/2012 | Chavez et al. |
| 2016/0187974 | A1 * | 6/2016 | Mallinson ............... G06F 1/163 463/32 |
| 2016/0364910 | A1 | 12/2016 | Higgins et al. |
| 2017/0131767 | A1 | 5/2017 | Long |
| 2017/0354871 | A1 | 12/2017 | Okamura |
| 2018/0008141 | A1 | 1/2018 | Krueger |
| 2018/0137673 | A1 | 5/2018 | Shi et al. |
| 2018/0295337 | A1 | 10/2018 | Hicks et al. |
| 2018/0314346 | A1 * | 11/2018 | Kirmani ................ G06F 3/0346 |
| 2018/0329024 | A1 | 11/2018 | Send et al. |
| 2018/0329517 | A1 | 11/2018 | Steedly et al. |
| 2019/0041979 | A1 | 2/2019 | Kirchner et al. |
| 2019/0243472 | A1 | 8/2019 | Stafford et al. |
| 2019/0355138 | A1 | 11/2019 | Hall et al. |
| 2020/0201045 | A1 | 6/2020 | Liu et al. |
| 2020/0241649 | A1 | 7/2020 | Stafford et al. |
| 2021/0026464 | A1 | 3/2021 | Yamada et al. |
| 2021/0081040 | A1 | 3/2021 | Sengelaub |
| 2021/0126634 | A1 | 4/2021 | Lee et al. |
| 2021/0216133 | A1 | 7/2021 | Stafford et al. |
| 2021/0227194 | A1 | 7/2021 | Hicks |
| 2021/0350602 | A1 | 11/2021 | Ye et al. |
| 2021/0365064 | A1 | 11/2021 | Liu |
| 2022/0003994 | A1 | 1/2022 | Petljanski et al. |
| 2022/0011860 | A1 | 1/2022 | Cappello et al. |
| 2022/0014689 | A1 | 1/2022 | Zahnert et al. |
| 2022/0157083 | A1 | 5/2022 | Jandhyala et al. |
| 2022/0197376 | A1 | 6/2022 | Boyle et al. |
| 2022/0374543 | A1 | 11/2022 | Chen et al. |
| 2023/0398432 | A1 | 12/2023 | Ye et al. |
| 2023/0398433 | A1 | 12/2023 | Ye et al. |
| 2023/0398434 | A1 | 12/2023 | Ye |
| 2023/0400911 | A1 | 12/2023 | Ye et al. |
| 2023/0400915 | A1 | 12/2023 | Ye et al. |
| 2023/0401723 | A1 | 12/2023 | Ye et al. |

FOREIGN PATENT DOCUMENTS

| | | |
|---|---|---|
| EP | 3993398 A1 | 5/2022 |
| WO | 2021021839 A1 | 2/2021 |

OTHER PUBLICATIONS

Tavanaei, Amirhosssein et al. "Deep Learning in Spiking Neural Networks" Neural Networks (2018) arXiv:1804.0815 [cs.NE] published; Jan. 20, 2019, Available at: https://arxiv.org/abs/1804.08150, , Accessed May 12, 2022.

U.S. Appl. No. 17/837,894, Jun. 10, 2022, Xiayong Ye.

U.S. Appl. No. 17/837,911, Jun. 10, 2022, Xiayong Ye.

U.S. Appl. No. 17/837,932, Jun. 10, 2022, Xiayong Ye.

U.S. Appl. No. 17/837,945, Jun. 10, 2022, Xiayong Ye.

U.S. Appl. No. 17/837,968, Jun. 10, 2022, Xiayong Ye.

U.S. Appl. No. 17/837,986, Jun. 10, 2022, Xiayong Ye.

European Search Report for European Application No. 23173096.1, dated Oct. 25, 2023.

Franklin, "The Kalman Filter, Explained Sinply", thekalmanfilter.com, Dec. 31, 2020, Retrieved on Jul. 13, 2023, Available at: https://thekalmanfilter.com/kalman-filter-explained-simply/.

International Search Report and Written Opinion for International Application No. PCT/US2023/018390, dated Sep. 22, 2023.

International Search Report and Written Opinion mailed Aug. 17, 2023 for International Patent Application No. PCT/US23/18388.

Non-Final Office Action for U.S. Appl. No. 17/837,894, dated Aug. 28, 2023.

Non-Final Office Action for U.S. Appl. No. 17/837,945, dated Sep. 14, 2023.

Non-Final Office Action for U.S. Appl. No. 17/837,968, dated Sep. 8, 2023.

Non-Final Office Action for U.S. Appl. No. 17/837,986, dated Sep. 26, 2023.

Notice of Allowance for U.S. Appl. No. 17/837,945, dated Feb. 22, 2024.

Notice of Allowance for U.S. Appl. No. 17/837,986, dated Jan. 23, 2024.

International Search Report & Written Opinion dated Jul. 21, 2023 for International Application No. PCT/US2023/018389.

International Search Report & Written Opinion dated Jul. 21, 2023 for International Application No. PCT/US2023/018392.

International Search Report and Written Opinion for International Application No. PCT/US2023/018386, dated Jul. 29, 2023.

Final Office Action for U.S. Appl. No. 17/837,894, dated Mar. 14, 2024.

Notice of Allowance for U.S. Appl. No. 17/837,968, dated May 1, 2024.

* cited by examiner

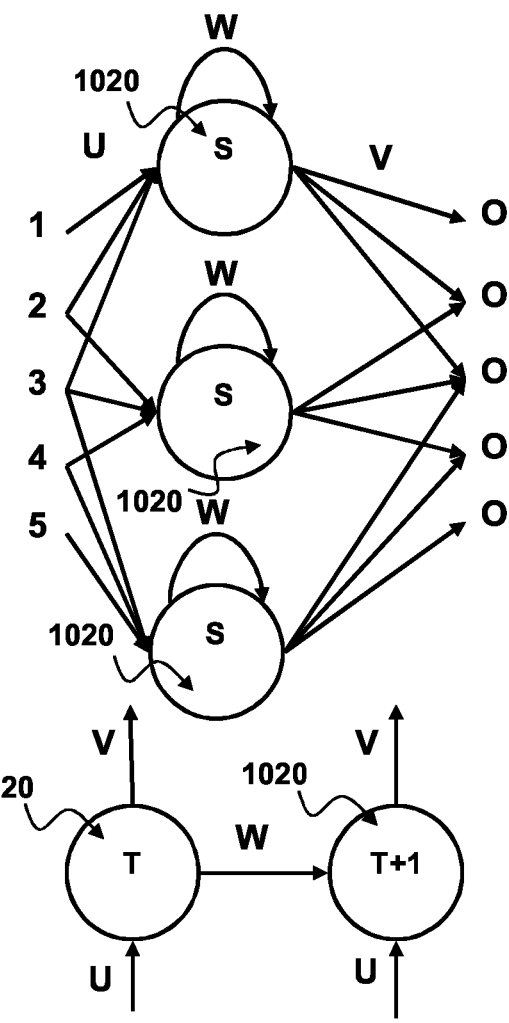
FIG. 10A
FIG. 10B
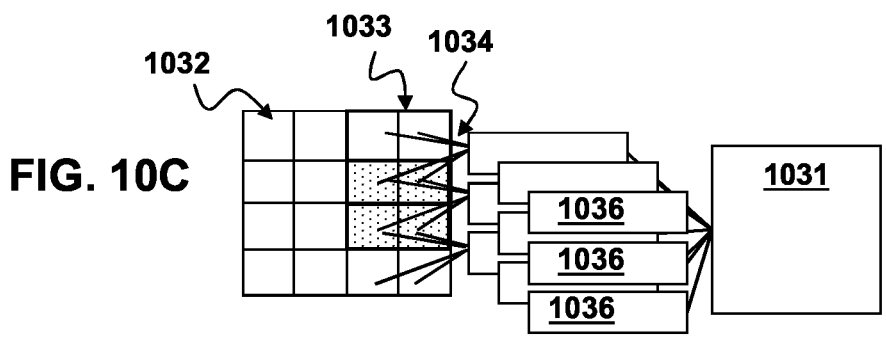
FIG. 10C

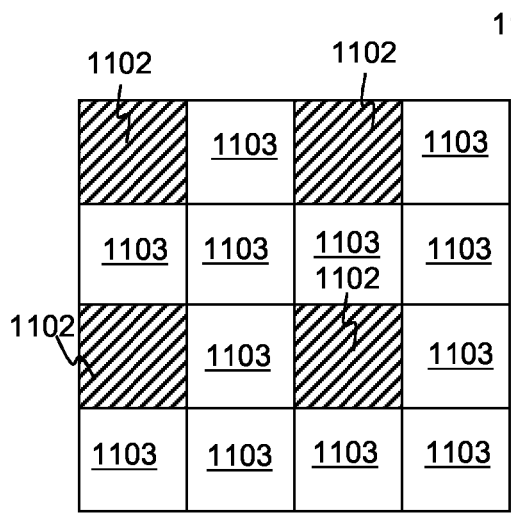
FIG. 11A
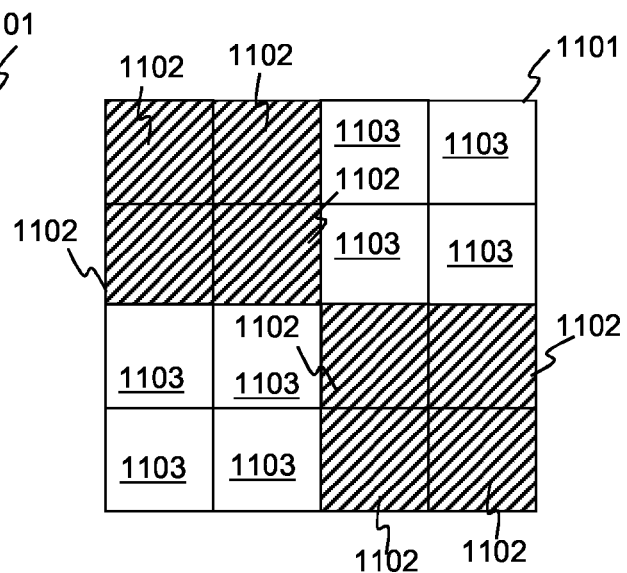
FIG. 11B
FIG. 11C
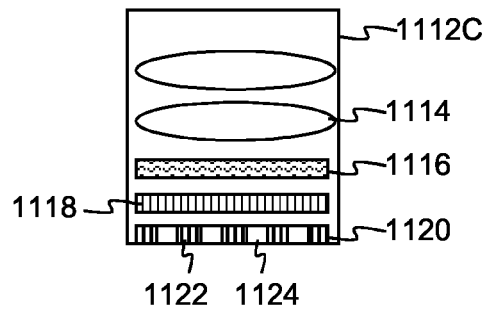
FIG. 11D
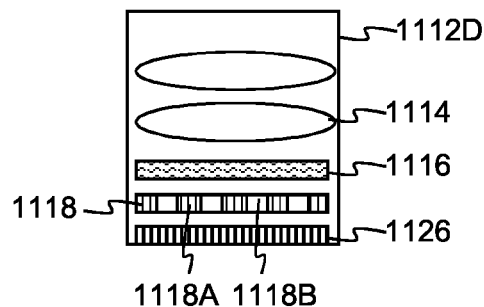

TIME

ASYNCHRONOUS DYNAMIC VISION SENSOR LED AI TRACKING SYSTEM AND METHOD

FIELD OF THE INVENTION

Aspects of the present disclosure relate to game controller tracking, specifically aspects of the present disclosure relate to game controller tracking using a dynamic vision sensor.

BACKGROUND OF THE INVENTION

Modem Virtual Reality (VR) and Augmented Reality (AR) implementations rely on accurate and fast motion tracking for user interaction with the device. AR and VR often rely on information relating to the location and orientation of a controller relative to other objects. Many VR and AR implementations rely on a combination of inertial measurements taken by accelerometers or gyroscopes within a controller and visual detection of the controller by an external camera to determine the location and orientation of the controller.

Some of the earliest implementations use infrared lights detected by an infrared camera with a defined detection radius on a game controller pointed at a screen. The camera takes images at a moderately fast rate of 200 frames per second and the location of the infrared lights are determined. The distance between the infrared lights is predetermined and from the relative location of the infrared lights in the camera image a position of the controller relative to the screen can be calculated. Accelerometers are sometimes also used to provide information on relative three-dimensional change in position or orientation of the controller. These prior implementations rely on a fixed position of a screen and a controller that is pointed towards the screen. In modem VR and AR implementations the Screens may be placed close to a user's face in a head mounted display that moves with the user. Thus, having an absolute light position (also referred to as a light house) becomes undesirable because the user must set up independent light house points that require extra set up time and limit the extent of the user's movement. Additionally, even the moderately fast frame rate of the infrared camera at 200 frames per second was not fast enough to provide smooth feedback for motion. Furthermore, this simplistic set up does not lend itself for use with more modern inside-out detection methods such as room mapping and hand detection.

More recent implementations use a camera and accelerometer in conjunction with trained machine learning algorithms trained to detect hands, controllers and/or other body parts. For smooth motion detection a high frame rate camera must be used to generate image frames for body part/ controller detection. This generates a large amount of data that must be processed quickly for a smooth update rate. Thus, expensive hardware must be used to process the frame data. Additionally, much of the frame data in each of the frames is discarded as unnecessary because it is not related to motion tracking.

It is within this context that aspects of the present disclosure arise.

BRIEF DESCRIPTION OF THE DRAWINGS

The teachings of the present invention can be readily understood by considering the following detailed description in conjunction with the accompanying drawings, in which:

FIG. 10A is a diagram depicting the basic form of an RNN having a layer of nodes each of which is characterized by an activation function, one input weight, a recurrent hidden node transition weight, and an output transition weight according to aspects of the present disclosure.

FIG. 10B, is a simplified diagram showing that the RNN may be considered a series of nodes having the same activation function moving through time according to aspects of the present disclosure.

FIG. 10C depicts an example layout of a convolution neural network such as a CRNN according to aspects of the present disclosure.

FIG. 11A is a diagram depicting a hybrid DVS having multiple co-located sensor types according to aspects of the present disclosure.

FIG. 11B is a diagram of a hybrid DVS having multiple sensor types arranged in a checkerboard pattern in the array according to aspects of the present disclosure.

FIG. 11C is a cross-sectional schematic diagram of a hybrid DVS having multiple sensor types arranged in a pattern in the array according to aspects of the present disclosure.

FIG. 11D is a cross-sectional schematic diagram of a hybrid DVS having multiple filter types arranged in a pattern in the array according to aspects of the present disclosure.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

A new type of vision system has recently been developed called, a Dynamic Vision System (DVS) the DVS utilizes only the change in light intensity of an array of light sensitive pixels to resolve changes in a scene. The DVS has an extremely fast update rate and instead of delivering a stream of image frames, the DVS provides a near continuous stream of locations of changes in pixel intensity. Each change in pixel intensity may be called an Event. This has the added benefit of greatly reducing the extraneous data output.

Two or more light sources may provide continuous updates as to the location of the DVS camera in relation to the position indicator lights at an update rate determined by the speed of flashing of the lights. In some implementations the two or more light sources may be infrared light sources and the DVS may use infrared light sensitive pixels. Alternatively, the DVS may be sensitive to the visible light spectrum and the two or more light sources may be visible light sources or visible light at a known wavelength. In implementations having a DVS sensitive to visible light, the DVS may also be sensitive to motion occurring within its field of view (FOV). The DVS may detect changes in light intensity caused by reflection of light off of the moving surface. In implementations using an Infrared sensitive DVS an infrared illuminator light may be used to detect movement in the FOV through reflection.

Implementations

Figure 1:
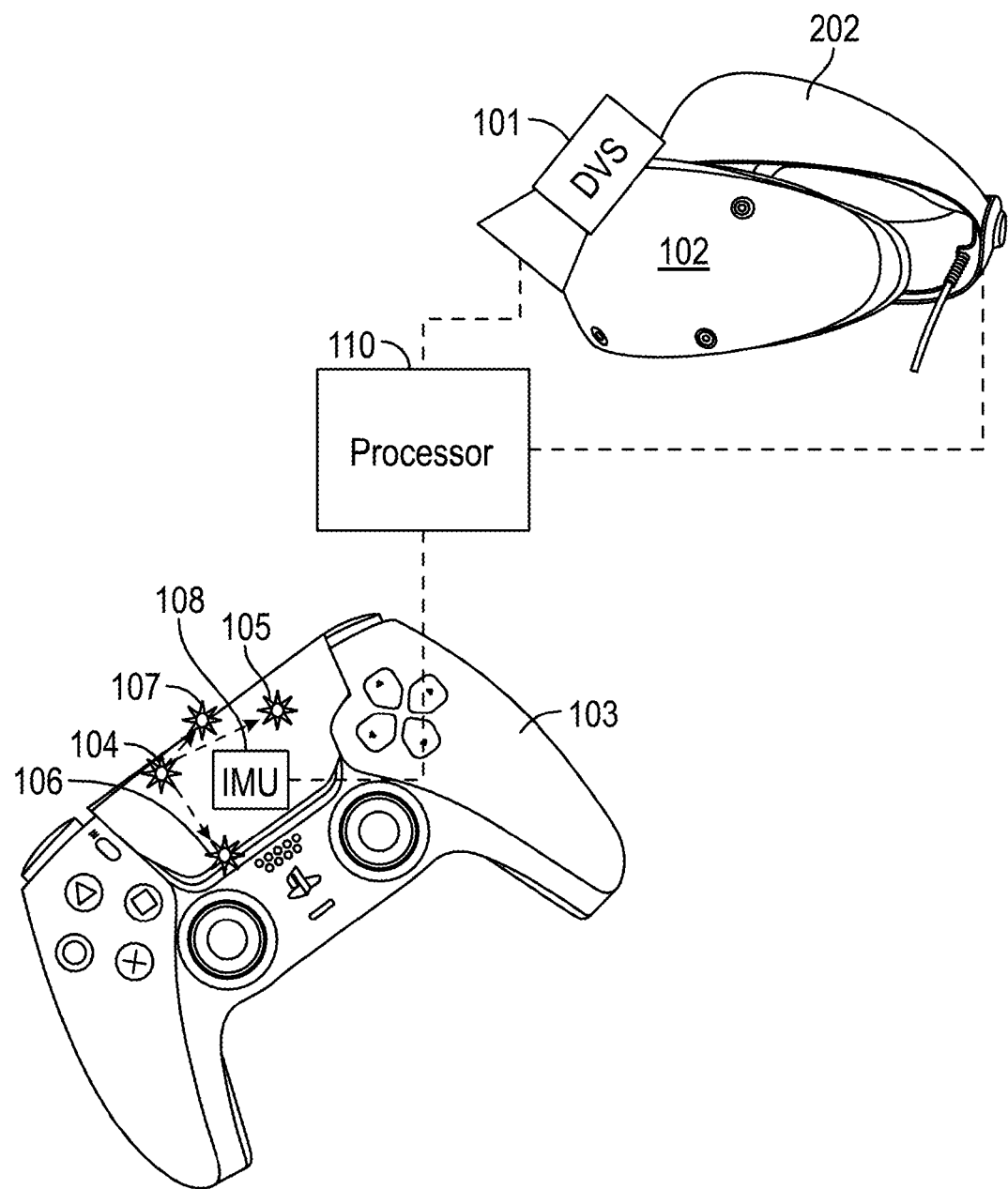
FIG. 1 is a diagram depicting an implementation of game controller tracking using a DVS with a single sensor array according to an aspect of the present disclosure.

FIG. 1 depicts an example of an implementation of game controller tracking using a DVS 101 with a single sensor array according to an aspect of the present disclosure. In the implementation shown the DVS is mounted to a headset 102, which may be part of a head mounted display. A controller 103 including two or more light sources is within the field of view of the DVS 101. In the example shown, the controller 103 includes four light sources 104, 105, 106, and 107. These light sources have a known configuration with respect to each other and with respect to the controller 103. Here, there is one DVS with a single light sensitive array. As such, four light sources may be used to accurately determine the position and orientation of the controller 103 relative to the DVS 101. The known information about the light sources may include the distance between each of the light sources with respect to each of the other light sources and the location of each of the light sources on the controller 103. As shown the three light sources 104, 105, 106 may describe a plane and a light source 107 may be out of plane with respect to the plane described by the three light sources 104, 105, 106. The light sources here, have a known configuration of, for example and without limitation, a first light source 104 is located on a top front left side and second light source 105 is located on a top front right side, a third light source 106 is located on a top back left side and a fourth light source 107 is located on a bottom, front middle of the controller. With four light sources a DVS having a single light sensitive array may be able to determine movements of the controller in the X, Y, and Z axis. Additionally, an inertial measurement unit (IMU) 108 may be coupled to the controller 103. By way of example, the IMU 108 may include an accelerometer configured to measure acceleration with respect to one, two, or three axes. Alternatively, the IMU may include a gyroscope configured to sense changes in rotation with respect to one, two, or three axes. In some implementations, the IMU may include both an accelerometer and a gyroscope. The IMU 108 may be used to refine movement, position, and orientation determination with the information from the DVS 101 using a processor. The processor may be located in the headset 102, a game console or other computing device (not shown). The DVS 101, headset 102, and IMU 108 may be operably coupled to a processor 110, which may be located on the headset 102, the controller, 103 or a separate device, such as a personal computer, laptop computer, tablet computer, smartphone, or gaming console. The processor may implement tracking as described herein, e.g., as discussed below with respect to FIG. 4, FIG. 8 and FIG. 9. In addition, the processor 110 may control the flashing of the light sources 104, 105, 106.

During operation, the DVS 101 having a light sensitive array may detect movement of the light sources 104, 105, 106, 107 with the light sensitive array, the change in light detected by the light sensitive array may be sent to the processor. In some implementations the light sources may be configured to turn on and off in a predetermined pattern with, for example and without limitation circuitry and/or signals from the processor. The predetermined pattern may be used by the processor to determine the identity of each light source. The identity of the light source may include a known location with respect to the controller and with respect to the other light sources. In other implementations each light source may be configured to turn off and on in a predetermined pattern and that pattern may be used to determine the identity of that specific light source. In some implementations the processor may fit a known configuration of the light sources with respect to the controller to events detected by the light sensitive array.

The DVS may have a near continuous update rate which can be discretely approximated to about 1 million updates per second. The DVS with its high update rate may be able to resolve the extremely fast flashing patterns of the light sources. The flashing rate is limited mainly by the Nyquist frequency, i.e., half the sample rate of the DVS. The light sources may be flashed with a duty cycle suitable for detection of the flashes by the DVS. Generally speaking, the "on" time for the flashes should be sufficiently long that they can be consistently detected by the DVS. Additionally, small differences in flashing rates may be detectable due to the high update rate.

The light sources 104, 105, 106, 107 may be broad visible spectrum lights such as incandescent lights or white Light Emitting Diodes. Alternatively, the light sources 104, 105, 106, 107 may be infrared lights or the light sources may have a specific light spectra profile detectable by the DVS 101. The DVS 101 may include a light sensitive array that is configured to detect the emission spectra of the light sources 104, 105, 106, 107. For example, and without limitation, if the light sources are infrared lights, the light sensitive array of the DVS may be sensitive to infrared light or if the light sources have a specific emission spectrum, the light sensitive array may be configured to have increased sensitivity to the specific emission spectra of the light source. Additionally for example and without limitation the light sensitive array of the DVS may be insensitive or exclude other wavelengths of light not emitted by the light sources e.g., the light sensitive array may be configured only to detect infrared light if the light sources are infrared lights.

Figure 2:
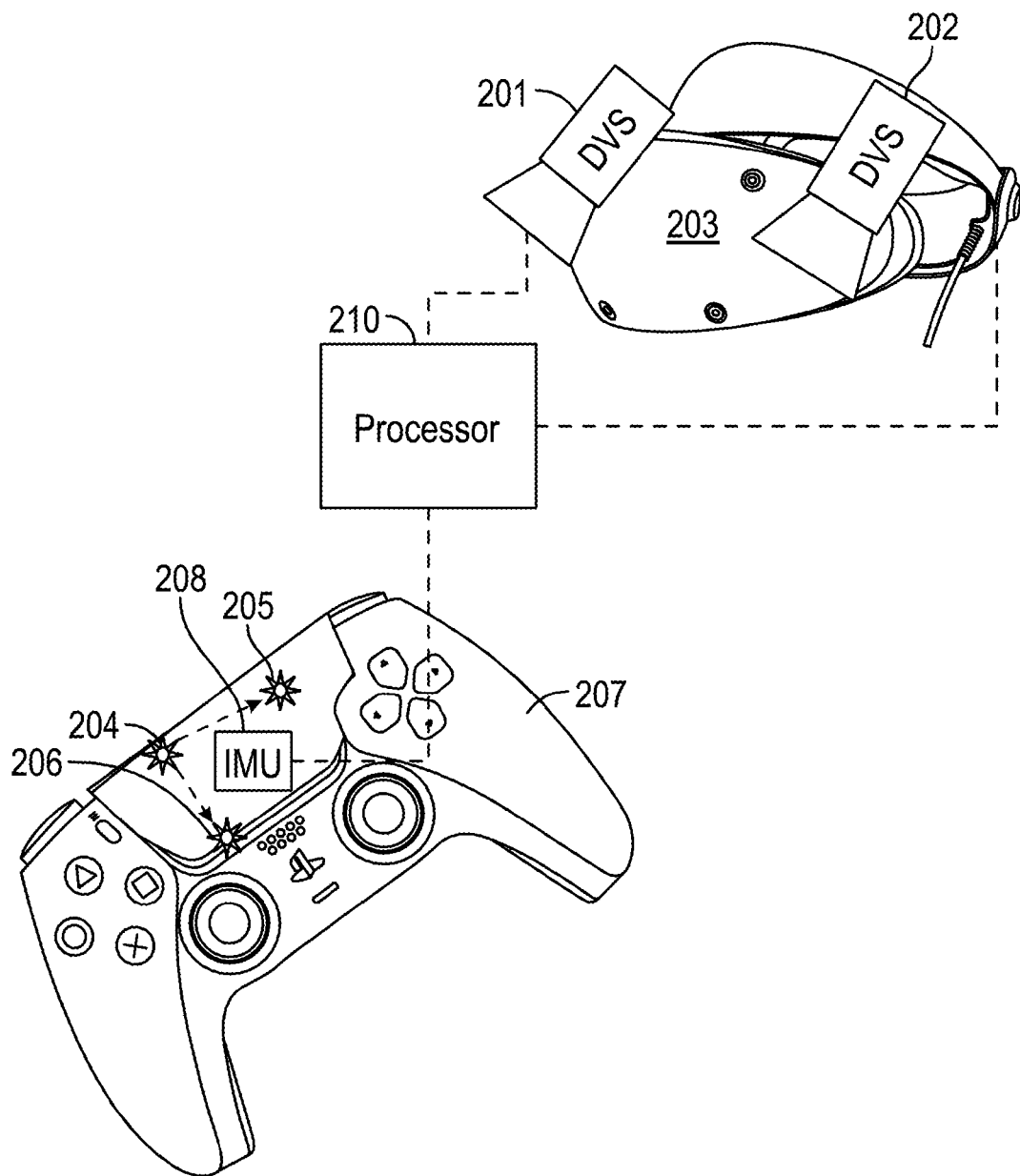
FIG. 2 is a diagram depicting an implementation of game controller tracking using a DVS with a dual sensor array according to an aspect of the present disclosure.

FIG. 2 illustrates an example of an implementation of game controller tracking using a DVS with a dual sensor array according to an aspect of the present disclosure. In this implementation the headset 203 includes a first DVS 201 and a second DVS 202. Alternatively, the headset 203 may include a DVS with a first light sensitive array 201 and a second light sensitive array 202. The general function of the light sources and DVS is similar as to as described above with respect to FIG. 1. The information from the second DVS or Second array may be combined with information from the first array to provide a better fit for controller orientation and some depth information. The two DVS or light sensitive arrays may have fields of view that partially overlap allowing the use of binocular parallax.

The two DVS or two light sensitive arrays provide binocular vision for depth sensing. This further allows for a reduction in the number of light sources. The first DVS and second DVS or first light sensitive array and second light sensitive array may be separated by a known distance, for example and without limitation around 50-100 millimeters or greater than 100 millimeters. More generally, the separation is large enough to provide sufficient parallax for a desired depth sensitivity but not so large so that there is no overlap between the fields of view. As shown, the controller 207 may include a first light source 204, a second light source 205 and a third light source 206. A fourth light source coupled to the controller may not be necessary as the information from the two DVS or two arrays provide enough information for determination of the position and orientation of the controller. The controller may include an IMU 208 which may provide additional inertia information used to refine the position and orientation determination.

The first DVS 201, second DVS 202 headset 203, and IMU 208 may be operably coupled to a processor 210, which may be located on the headset 203, the controller 207 or a separate device, such as a personal computer, laptop computer, tablet computer, smartphone, or gaming console. The processor may implement tracking as described herein, e.g., as discussed below with respect to FIG. 4, FIG. 8 and FIG. 9. In addition, the processor 210 may control the flashing of the light sources 204, 205, 206.

While FIG. 2 shows two DVS or two light sensitive arrays aspects of the present disclosure are not so limited. The device may include any number of DVS or light sensitive arrays. For example, and without limitation three DVS or a DVS having three separated light sensitive arrays may allow for the use only two light sources coupled with the controller. The third DVS or light sensitive array may be non-collinear with the other two DVS or arrays. Similar to the binocular parallax each additional DVS or light sensitive array may be separated by a known distance and have fields that partially overlap allowing for greater use of parallax effects. Additionally, some implementations may include multiple DVS each having multiple light sensitive arrays. For example, and without limitation there may be two DVS each having two separate light sensitive arrays.

Figure 3:
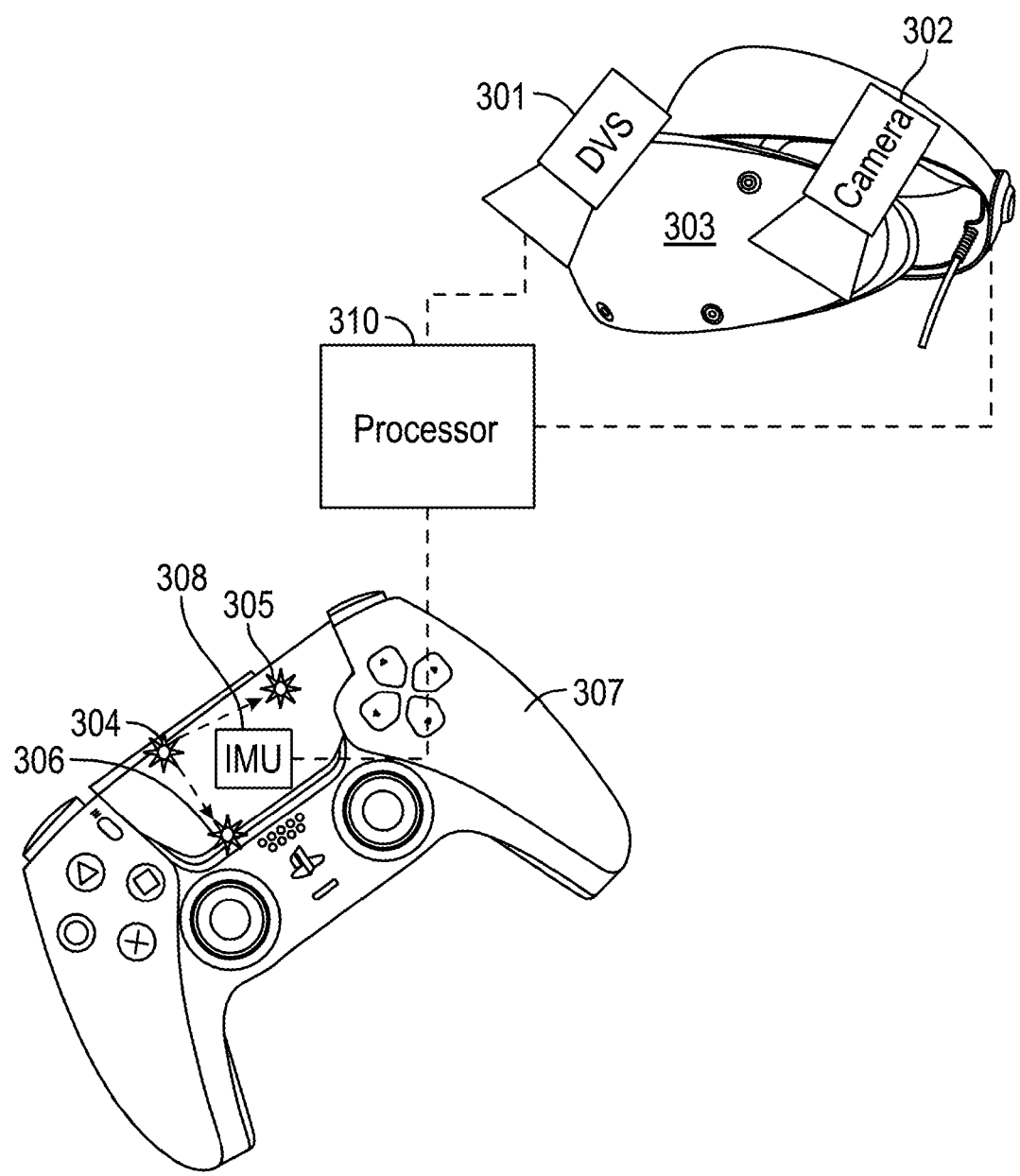
FIG. 3 is a diagram depicting an implementation of game controller tracking using a combination DVS with a single sensor array and a camera according to an aspect of the present disclosure.

FIG. 3 depicts an example of an implementation of game controller tracking using a combination DVS with a single sensor array and a camera according to an aspect of the present disclosure. In this implementation the DVS 301 is supplemented with a camera 302. The DVS 301 and camera 302 may be coupled to a headset 303. The DVS 301 and camera 302 may have a partially overlapping field of view or share the same field of view. The controller may include three or more light sources 304, 305, 306 on a controller 307. The DVS 301 and camera 302 may be used together to determine the position and orientation of the controller. Frames from the camera 302 may be interpolated using events from the DVS 301. Image frames may also be used to perform simultaneous localization and mapping to improve controller orientation and position determination. Additionally, image frames from the camera may be used to perform inside out tracking of the user using a machine learning algorithm, for example hand tracking or foot tracking. An IMU 308 may provide additional inertial information used to further refine the determination of the position and orientation of the controller.

The first DVS 301, second DVS 302 headset 303, and IMU 308 may be operably coupled to a processor 310, which may be located on the headset 303, the controller 307 or a separate device, such as a personal computer, laptop computer, tablet computer, smartphone, or gaming console. The processor may implement tracking as described herein, e.g., as discussed below with respect to FIG. 4, FIG. 8 and FIG. 9. In addition, the processor 310 may control the flashing of the light sources 304, 305, 306.

Figure 5:
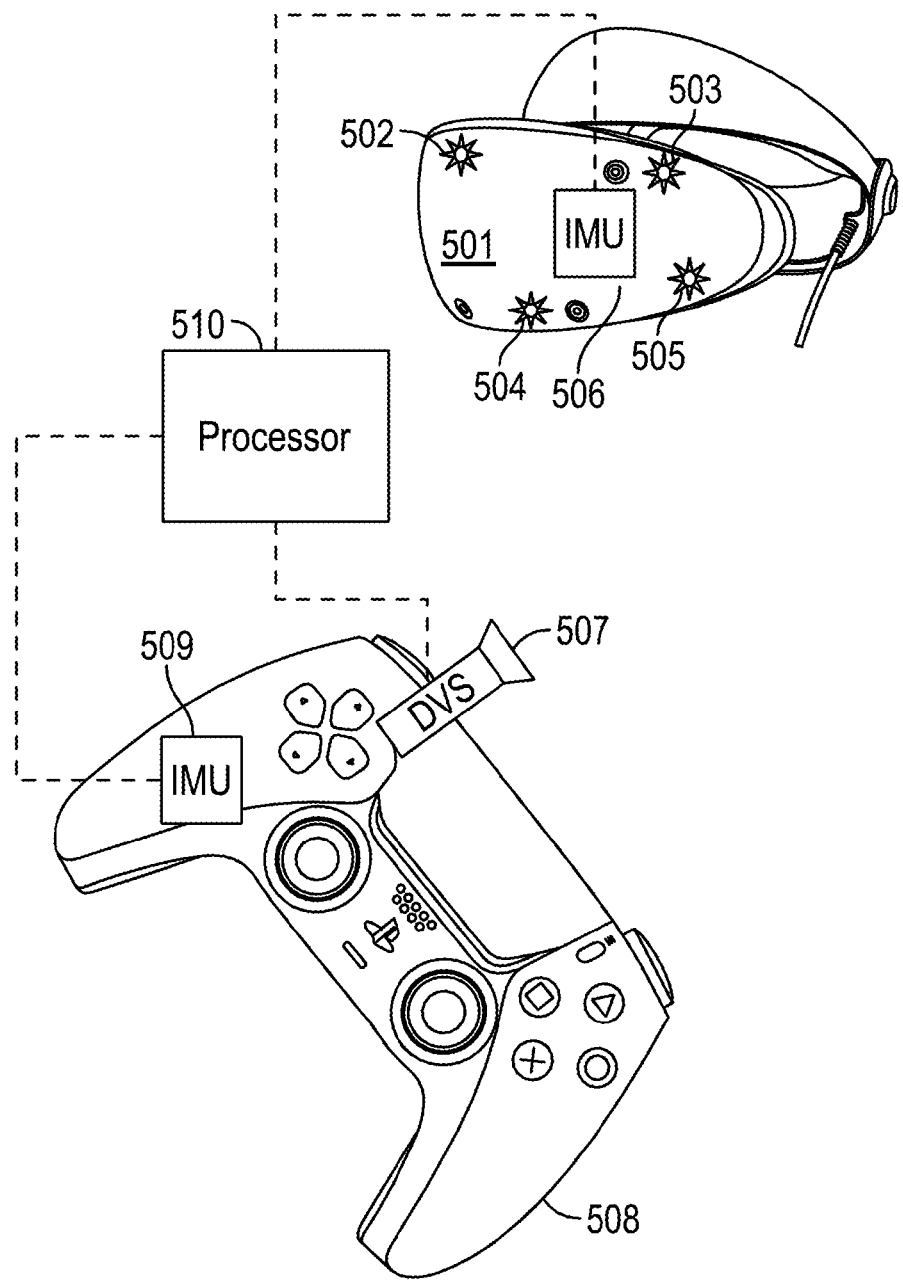
FIG. 5 is a diagram depicting an implementation of head tracking or other device tracking using a controller having DVS with a single sensor array according to an aspect of the present disclosure.

FIG. 5 is depicts an example of an implementation of head tracking or other device tracking using a controller having a DVS with a single sensor array according to an aspect of the present disclosure. Here, a DVS 507 is mounted to a controller 508. A headset 501 that is within a field of view of the DVS 507 is tracked using light sources attached to the headset. The headset 501 may include two or more light sources, here four light sources 502, 503, 504 and 505. Four light sources provide accurate information for determination of position in three dimensions with a single DVS. A smaller number of light sources may be used with additional DVS or cameras. The position of each light source relative to the headset 501 may be known to the system and of some importance to provide relevant information to the DVS. Here, light sources 502, 503 and 504 describe a plane; light source 505 is located out of plane of the other light sources 502, 503 and 504. This facilitates detection of location, orientation, or movement of the headset in three dimensions. The headset 501 may include an IMU 506 which may be to improve position and orientation estimation with information from the DVS 507. Additionally, the controller 508 may include an IMU 509. The information from the controller IMU 509 may be used to further refine the position and orientation determination of the headset, for example and without limitation the IMU information may be used to determine if the controller is moving relative to the headset and velocity or acceleration of that movement.

The headset 501, IMU 506, DVS 507, controller IMU 509 may be operably coupled to a processor 510, which may be located on the headset 501, the controller 508 or a separate device, such as a personal computer, laptop computer, tablet computer, smartphone, or gaming console. The processor may implement tracking as described herein, e.g., as discussed below with respect to FIG. 4, FIG. 8 and FIG. 9. In addition, the processor 510 may control the flashing of the light sources 502, 503, 504, 505.

Figure 6:
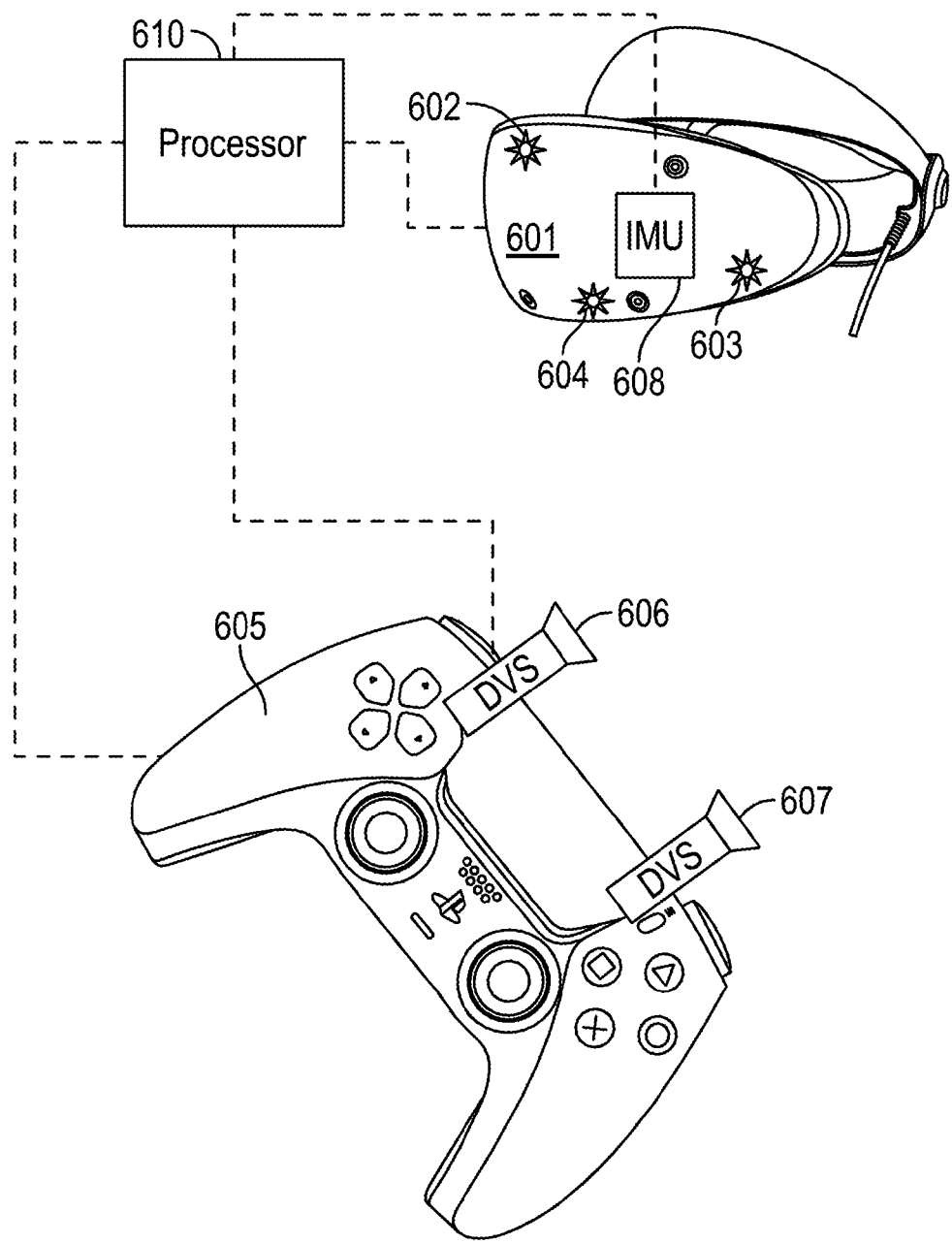
FIG. 6 is a diagram depicting an implementation of head tracking or other device tracking using a game controller having a DVS with dual sensor arrays according to an aspect of the present disclosure.

FIG. 6 illustrates an example of an implementation of head tracking or other device tracking using a game controller having a DVS with dual sensor arrays according to an aspect of the present disclosure. Here the controller 605 is coupled to two DVS 606, 607 or a single DVS having two light sensitive arrays 606 and 607. As discussed above the two DVS or two light sensitive arrays may be separated by a suitable distance, e.g., between 500 and 1000 millimeters, and have partially overlapping fields of view. This allows for use of the parallax effect for depth determination. Additionally, the headset 601 may include three light sources 602, 603, 604 and an IMU 608. The use of two DVS or two separated arrays 606, 607 may allow the use of less than four light sources, for example and without limitation three light sources. The two light sources 602, 603 may describe a line and the third light source 604 may be out of line with the other two light sources 602, 603. Information from an IMU 605 coupled to the headset 601 may be used to refine the position and orientation determination.

The headset 601, DVS 606, DVS 607, and IMU 608 may be operably coupled to a processor 610, which may be located on the headset 601, the controller 605 or a separate device, such as a personal computer, laptop computer, tablet computer, smartphone, or gaming console. The processor may implement tracking as described herein, e.g., as discussed below with respect to FIG. 4, FIG. 8 and FIG. 9. In addition, the processor 610 may control the flashing of the light sources 602, 603, 604.

Figure 7:
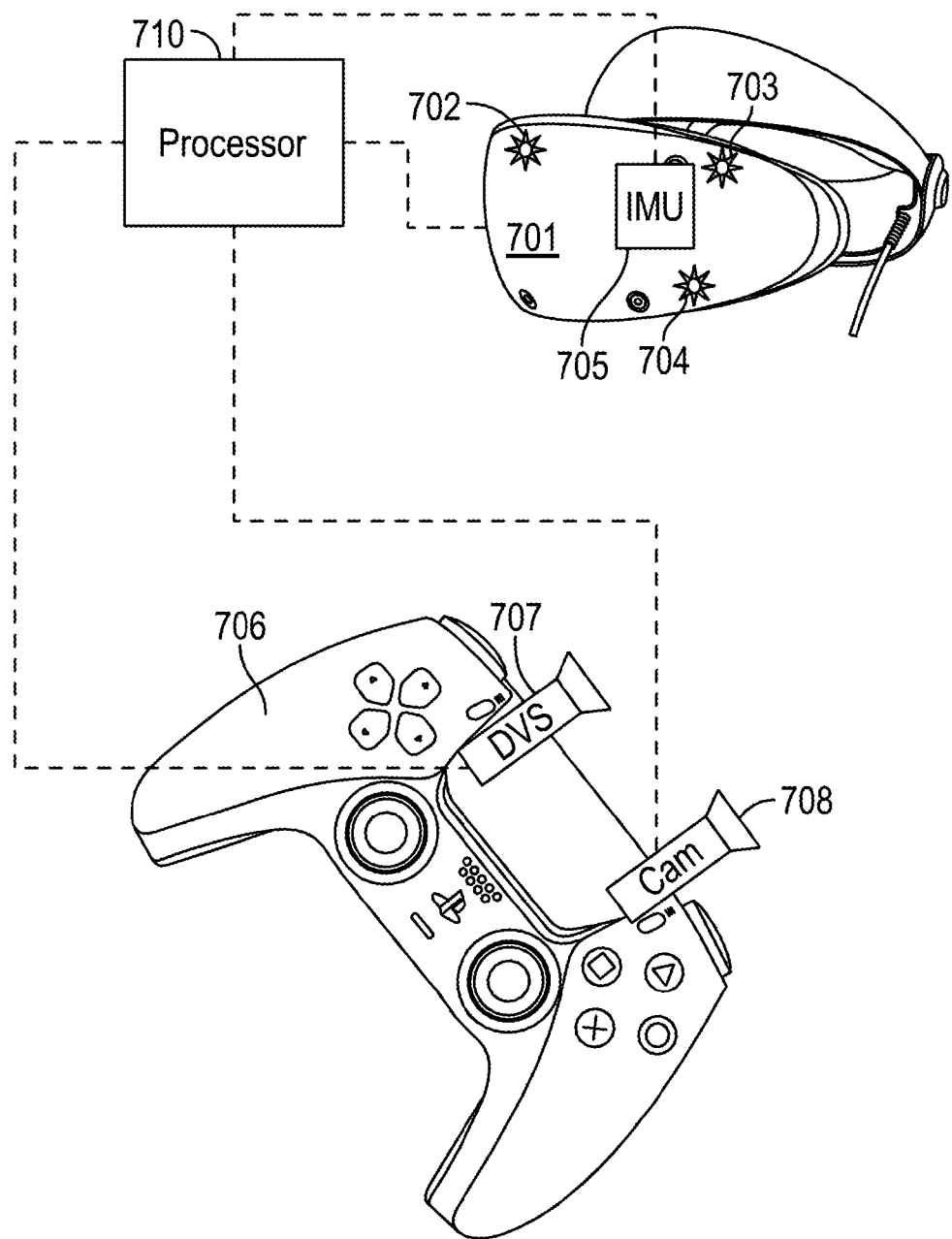
FIG. 7 is a diagram showing an implementation of head tracking or other device tracking using a controller having a combination DVS with a single sensor array and camera according to an aspect of the present disclosure.

FIG. 7 depicts an example of an implementation of head tracking or other device tracking using a controller having a combination DVS with a single sensor array and an image camera according to an aspect of the present disclosure. Here a DVS 707 and a camera 708 are coupled to a controller 706. The camera 708 and the DVS 707 may have partially overlapping fields of view or may have entirely overlapping fields of view. In some implementations camera pixels and DVS light sensitive elements may share the same light-sensitive array thereby acting as an integrated DVS and Camera.

Three or more light sources 702, 703, 704 may be coupled to the headset 701. For example, and without limitation the light sources may be integrated into the headset housing, each light source may be an LED, incandescent, halogen or florescent light emitter mounted to a circuit board within the headset housing or on the headset housing. In some implementations a single light emitter may create multiple light sources using plastic or glass light piping or optical fiber that splits light from the single emitter into two or more light sources on the headset housing.

The three or more light sources 702, 703, 704 may be configured to turn on and off in response to electronic signals. In some implementations the three or more light sources may turn on and off in a predetermined sequence. Each time the light sources 702, 703, 704 move or flash, the DVS 707 may generate an event. The camera 708 generates image frames of its field of view at a set frame rate. The high update rate DVS may allow image frames generated by the camera to be interpolated with DVS events.

In some implementations, an IMU 705 may also be coupled to the headset 701. The headset 701, IMU 705, DVS 707, camera 708, and IMU 608 may be operably coupled to a processor 710, which may be located on the headset 701, the controller 706 or a separate device, such as a personal computer, laptop computer, tablet computer, smartphone, or gaming console. The processor may implement tracking as described herein, e.g., as discussed below with respect to FIG. 4, FIG. 8 and FIG. 9. In addition, the processor 710 may control the flashing of the light sources 702, 703, 704.

Additionally in some implementations the cameras 708 may be a depth camera such as a depth time of flight (DTOF) sensor. DToF cameras acquire depth images by measuring the time it takes the light to travel from a light source to objects in a scene and back to a pixel array. By way of example, and not by way of limitation, a DToF camera may operate using continuous wave (CW) modulation, which is an example of an indirect time of flight (ToF) sensing method. In a CW ToF camera, the light from an amplitude modulated light source is backscattered by objects in the camera's field of view (FOV), and the phase shift between the emitted waveform and the reflected waveform is measured. By measuring the phase shift at multiple modulation frequencies, one can calculate a depth value for each pixel. The phase shift is obtained by measuring the correlation between the emitted waveform and the received waveform at different relative delays using in-pixel photon mixing demodulation.

A DTOF system generally includes an illumination module and an imaging module. The illumination module consists of a light source, a driver that drives the light source at a high modulation frequency, and a diffuser that projects the optical beam from the light source to a designed field of illumination (FOI). The DToF illumination module may include one or more light sources, which may be for example and without limitation an amplitude modulated light emitter such as a vertical cavity surface emitting laser (VCSEL) or edge emitting laser (EEL). The imaging module may include an imaging lens assembly, band-pass filter (BPF), microlens array and an array of light-sensitive elements that convert incident photon energy to electronic signals. The microlens array increases the amount of light that reaches the light-sensitive elements and the BPF reduces the amount of ambient light that reaches the light-elements and the microlens array.

Operation

Figure 4:
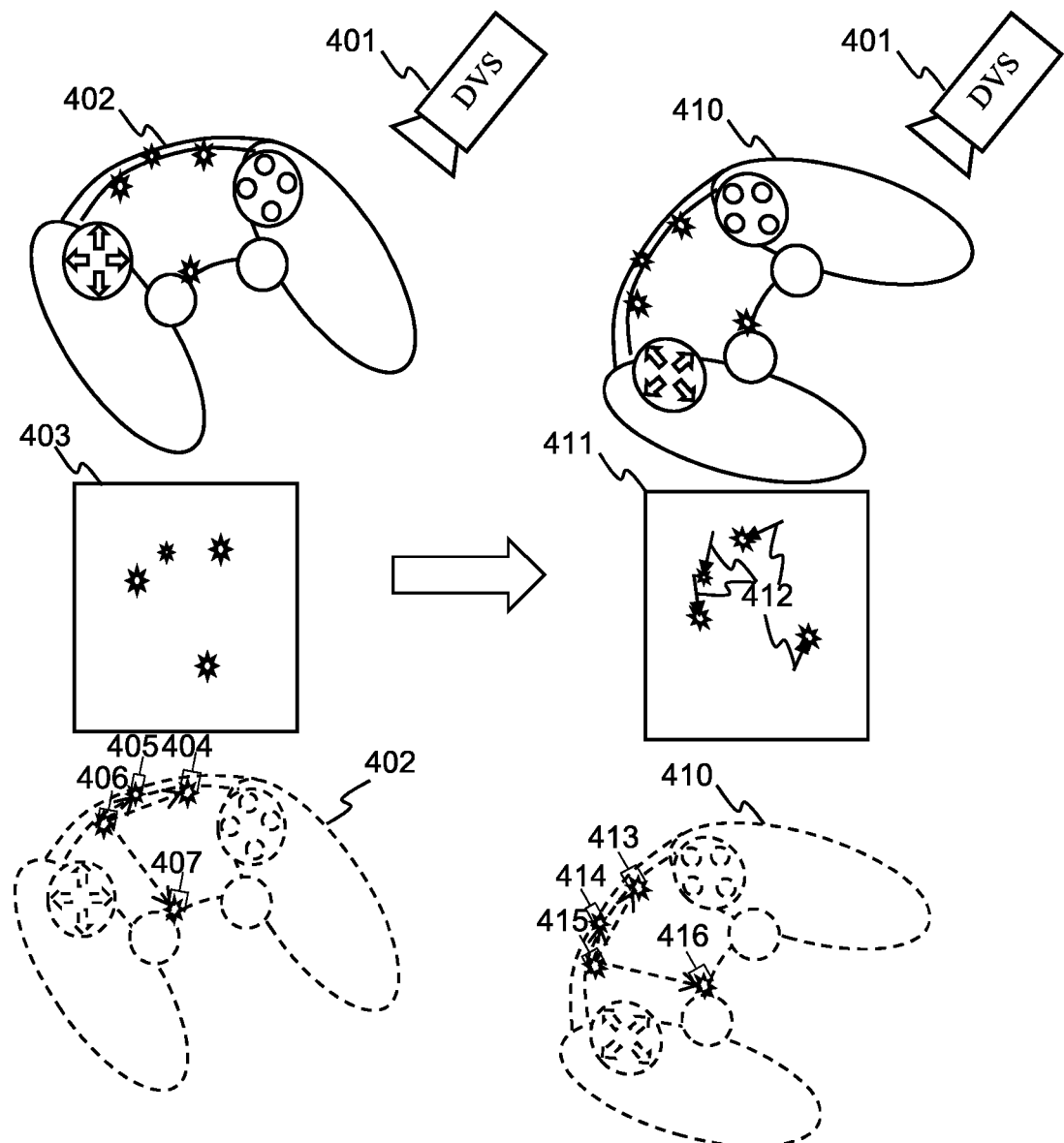
FIG. 4 is a diagram showing DVS tracking movement of a game controller having two or more light sources according to an aspect of the present disclosure.

FIG. 4 shows DVS tracking movement of a game controller having two or more light sources according to an aspect of the present disclosure. A DVS 401 has the controller 402 within its field of view. As shown, the controller 402 includes multiple light sources coupled to the controller body. The multiple light sources may be configured turn off and on again at a predetermined rate. Each flash of a light source within the field of view of the DVS 401 may generate one or multiple events 403 at the DVS. In the event 403 shown the light sources have all changed from an off state to an on state thus the event shows all of the light sources in an on state. Alternatively, depending on the sensitivity of the DVS, a change in the brightness of a light source may be sufficient to trigger an event 403. It should be noted that in other implementations the lights may turn off and on at different rates or at different times and therefore each event may correspond to less than all of the sources being lit. The times of the events generated by the flashing lights and their corresponding locations within the array may be recorded in a memory (not shown). In some implementations a position and orientation of the controller 402 may be reconstructed from one or more events from the DVS.

In some implementations each light source may flash in a pre-determined time sequence. The DVS may output a time each event occurred along with each event as, for example and without limitation, a time stamp. The time the event occurred may be used with the predetermined time sequence to determine the identity of each light in the event e.g., which event corresponds to which light source location. In the example shown the one or more events 403 output by the DVS 401 show a first light 406, second light 407, third light 408, and fourth light 409, detected by the light sensitive array. As discussed above, the identity of each light source may be determined from information output by the DVS and the predetermined flash sequence of the light sources. For example, and without limitation a light sensitive array of the DVS 401 may detect a light event 403 at time T+1, the predetermined sequence may provide that light source 406 is turned on at T+1, thus it is determined that the light event corresponds to light source 406. The predetermined sequence may be stored in a memory, for example as a table listing sequence timing and location of each light source. In some implementations the predetermined sequence may be encoded in the flashing of the lights themselves for example and without limitation each light may flash in a sequence indicating its identity. For example, a light source labeled 1 may blink in a Morse code sequence indicating the number one. The identity of the light event may then be recovered through analysis of light events. Alternatively, sequence information may come from the light source itself or driver of the light source indicating when the light source is on or off. Alternatively, the light sources may turn on and off simultaneously and a machine learning algorithm may then be applied to the detected light events 403 to fit a controller pose 402 to the events and the known configuration of the light sources.

Additionally, information from the events such as size, intensity and separation of the lights may be used to determine orientation and position of the light sources. The system may have information defining each light source's size, position on the controller body and intensity. From the differences between the detected size, intensity and separation; position and orientation may be determined with increased accuracy. Additionally, if one or more additional DVS or light sensitive arrays are present, parallax information may be used to further enhance the position and orientation determination.

During operation, the user may change the position and orientation of the controller 410. The relatively high update rate of the DVS may allow it to capture a sequence of events 411 as the light events move 412 during the change in position and orientation. The movement of the light events here is represented in FIG. 4 with vector arrows 412. As the detected light events move the determined position and orientation of the controller 410 may be updated or the determined position and orientation may be updated at a regular interval. The locations and times of events detected by the light sensitive elements of the DVS due to flashing of a first light 415, second light 416, third light 417, and fourth light 418 may be fit to a new position and orientation of the controller. Additionally inertial information from an IMU may be used to refine the movement and position and orientation of the controller 410.

Figure 8:
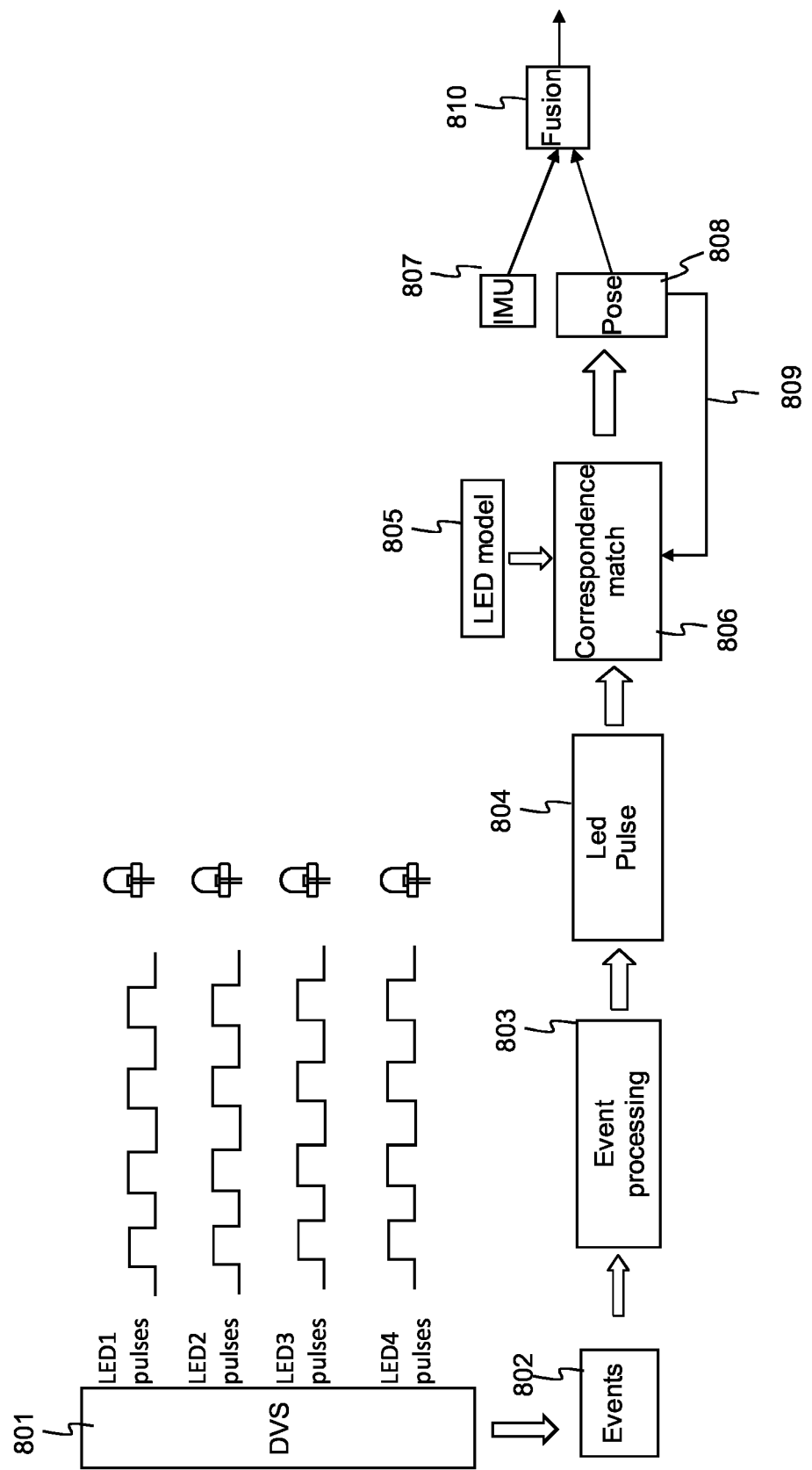
FIG. 8 is a flow diagram depicting a method for motion tracking with a DVS using one or more light source and a light source configuration fitting model according to an aspect of the present disclosure.

The flow diagram shown in FIG. 8 depicts a method for motion tracking with a DVS 801 using one or more light source and a light source configuration fitting model according to an aspect of the present disclosure. In this implementation the light sources (depicted as LEDs) may turn on and off simultaneously, independently or in a predetermined sequence. Movement of the light sources or flashing of one or more of the light sources generates an event 802 from the DVS 801. Generally, an event includes electronic signals that relay the following information: a time interval within which the event occurred, a location within the array of light sensing elements of the DVS 801 where the event occurred, and binary data (e.g., 1 or 0) corresponding to a change of light intensity greater than some detection threshold. Each event may be processed at 803 to format the event into a usable form such as, without limitation, placing event locations within a data array, associating time stamps with events, and aggregating multiple events. As an example of aggregating events, all events occurring individual elements in the array within a predefined time interval may be combined into a single data structure for analysis.

The processed events may then be analyzed to associate the detected DVS events with corresponding LED pulses 804. In some implementations each light source may be turned off and on with a unique predefined time interval and thus the time stamps of the aggregated events may be used to determine the predefined time interval from events to associate a particular light source to particular events. For example, and without limitation a spatial pattern of aggregated events occurring within the predefined time interval or sequence of time intervals may be analyzed to determine whether the pattern is consistent with pulsing of an LED. Event patterns that are too big or too small or too irregular in shape may be excluded as LED events. Additionally, timing of events may also be analyzed; events that are too short or too long may also be excluded.

A trained machine learning model 805 may be applied to the processed events. The model 805 may include information about the configuration of the light sources such as the size of the light sources and their relative locations with respect to the controller body. The machine learning model may be trained with training event data having corresponding masked positions and orientations of a controller as will be discussed in a later section. The trained machine learning model is applied to the processed event data to determine a correspondence 806 between the detected pulses 804 and a pose 808. The trained machine learning model may fit a pose 808, e.g., position and orientation, of the controller to the one or more processed events, e.g., detected LED pulses 804. Alternatively, a fitting algorithm may be applied to the processed events instead of the trained model 805. The fitting algorithm may use a hand developed model of the light sources to fit a position and orientation of the controller to the processed events. Alternatively, the fitting algorithm may be a hypothesis and test type algorithm which tries all the possible permutations of light correspondences, and finds the best fitting use redundant light sources. After that a tracking/prediction algorithm can be applied to keep tracking the light sources. Additionally, the predicted current pose may be used to predict the next pose 809. Inertial data from the IMU 807 may be fused 810 with the predicted pose 808 to generate the final predicted position and orientation of the controller. The fusion may be performed by a trained machine learning algorithm, trained to refine controller position and orientation using inertial data. Alternatively, the fusion may be performed by for example and without limitation a Kalman filter, or nonlinear optimization.

Figure 9:
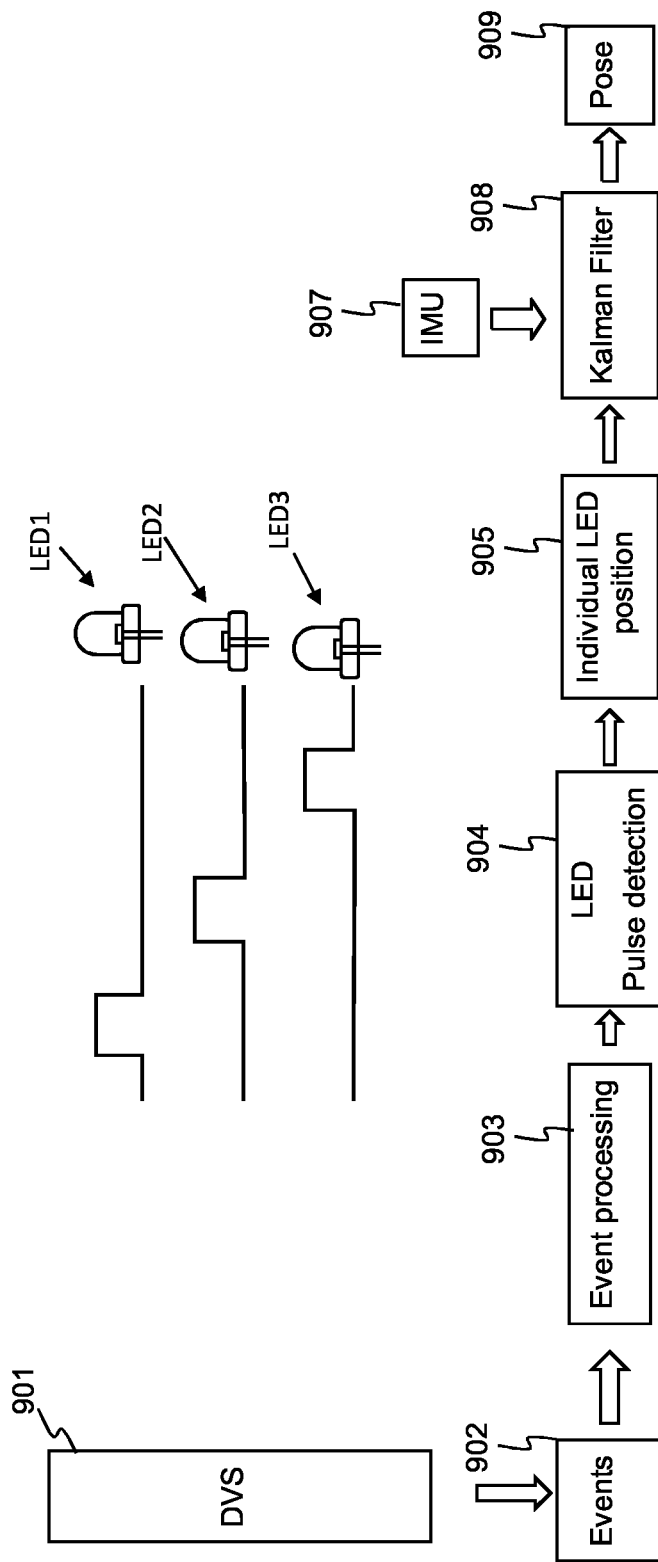
FIG. 9 is a flow diagram showing a method for motion tracking with a DVS using time stamped light source position information according to an aspect of the present disclosure.

FIG. 9 illustrates a method for motion tracking with a DVS using time stamped light source position information according to an aspect of the present disclosure. In this implementation times of the events output by DVS 901 are used to determine position and orientation of the controller. Here, the light sources are depicted as LEDs and each LED may turn on at a different time as depicted by the graphs. Each time an LED turns on or off, a DVS having the LEDs within its field of view may generate an event 902. Each event may include electronic signals corresponding to information such as a time interval within which the event occurred, a location within the array of light sensing elements of the DVS 901 where the event occurred, and binary data (e.g., 1 or 0) corresponding to a change of light intensity greater than some detection threshold. Each event may be processed 903 to format the event into a usable form such as, without limitation placing event locations within a data array and aggregating multiple events, e.g., by combining multiple events occurring at individual elements in the array within a predefined time interval into a single data structure, as discussed above. The processed events may then be analyzed to detect corresponding LED pulses 904. For example, and without limitation the shape and size of events may be analyze for regularity and fit of light sources, events that are too big or too small or too irregular in shape may be excluded as LED events, noise suppression such as event averaging may be perform to remove random events. Additionally, timing of events may also be analyzed; events that are too short or too long may also be excluded, or multiple events may be condensed into a single event by eliminating events that are collocated with an initial event and close in time but after an initial event.

Once events are processed, individual LED position may be determined 905. Determining the individual LED position may be performed by using the time sequence that the LEDs turn on and off. For example and without limitation, a time of an event or events may be compared to a known time sequence of LED flashes. The known time sequence may be for example a table having LED on and off times and locations on the controller body for each LED, or time stamps from an LED driver for when each LED is on or off. If timestamps are used, the timestamps may be correlated with LED locations on the controller body. From the timing sequence, LED location information and processed event information, a matching position and orientation of the controller may be determined. IMU data 907 may be combined with the previously determined LED locations and the inertial data from the IMU through a Kalman filter 908. The Kalman filter may predict the location of the light sources based on the inertial information from the IMU, this prediction may be combined with position information determined from the LED time sequence to refine movement data and produce a final pose 909 and refine future estimates.

General Neural Network Training

According to aspects of the present disclosure, the tracking system may use machine learning with neural networks (NN). For example, the trained model 805 discussed above may use machine learning as discussed below. The machine learning algorithm may use a training data set, which may include inputs from the DVS such as events or processed events with known controller positions and orientations as labeling. Additionally, machine learning algorithms using NNs may perform fusion between controller position and orientation determined from DVS information and inertial information from the IMU. The training set for fusion may for example and without limitation be potential controller positions and orientations and inertial data with final positions and orientations. In some implementations a machine learning algorithm may be trained to perform simultaneous localization and mapping (SLAM) with a training set with objects such as the ground, landmarks and body parts with hidden labelings. The hidden labeling may include the identity of the objects and their relative location. As is generally understood by those skilled in the art, SLAM techniques general solve the problem of constructing or updating a map of an unknown environment while simultaneously keeping track of an agent's location within it.

The NNs may include one or more of several different types of neural networks and may have many different layers. By way of example and not by way of limitation the neural network may consist of one or multiple convolutional neural networks (CNN), recurrent neural networks (RNN) and/or dynamic neural networks (DNN). The Motion Decision Neural Network may be trained using the general training method disclosed herein.

By of example, and not limitation, FIG. 10A depicts the basic form of an RNN that may be used, e.g., in the trained model 805. In the illustrated example, the RNN has a layer of nodes 1020, each of which is characterized by an activation function S, one input weight U, a recurrent hidden node transition weight W, and an output transition weight V. The activation function S may be any non-linear function known in the art and is not limited to the (hyperbolic tangent (tanh) function. For example, the activation function S may be a Sigmoid or ReLu function. Unlike other types of neural networks, RNNs have one set of activation functions and weights for the entire layer. As shown in FIG. 10B, the RNN may be considered as a series of nodes 1020 having the same activation function moving through time T and T+1. Thus, the RNN maintains historical information by feeding the result from a previous time T to a current time T+1.

In some implementations, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

FIG. 10C depicts an example layout of a convolution neural network such as a CRNN, which may be used, e.g., in the trained model 805 according to aspects of the present disclosure. In this depiction, the convolution neural network is generated for an input 1032 with a size of 4 units in height and 4 units in width giving a total area of 16 units. The depicted convolutional neural network has a filter 1033 size of 2 units in height and 2 units in width with a skip value of 1 and a channel 136 of size 9. For clarity in FIG. 10C only the connections 1034 between the first column of channels and their filter windows is depicted. Aspects of the present disclosure, however, are not limited to such implementations. According to aspects of the present disclosure, the convolutional neural network may have any number of additional neural network node layers 1031 and may include such layer types as additional convolutional layers, fully connected layers, pooling layers, max pooling layers, local contrast normalization layers, etc. of any size.

Figure 10D:
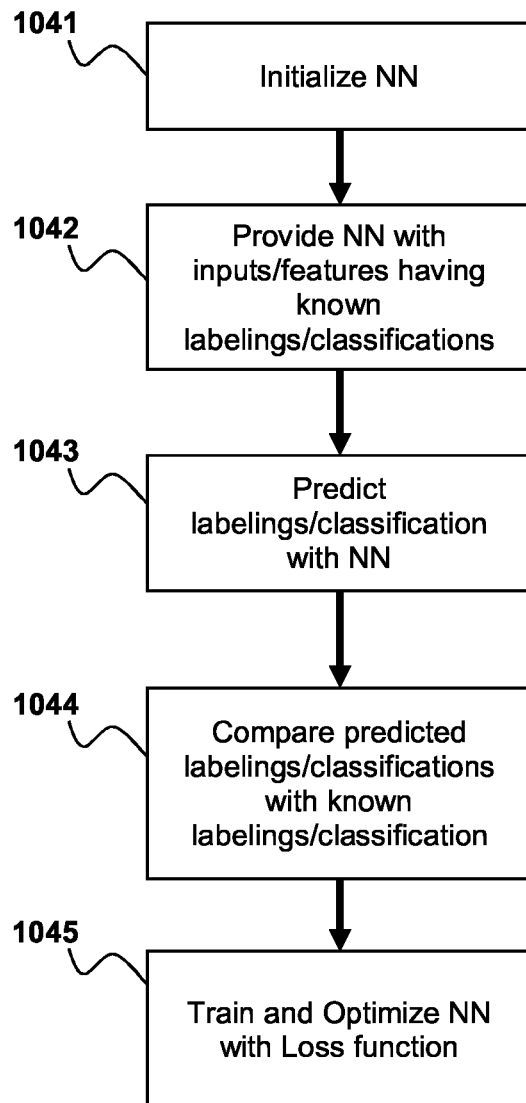
FIG. 10D shows a flow diagram depicting a method for supervised training of a machine learning neural network according to aspects of the present disclosure.

As seen in FIG. 10D Training a neural network (NN) begins with initialization of the weights of the NN at 1041. In general, the initial weights should be distributed randomly. For example, an NN with a tanh activation function should have random values distributed between $-1/\sqrt{n}$ and $1/\sqrt{n}$ where n is the number of inputs to the node.

After initialization, the activation function and optimizer are defined. The NN is then provided with a feature vector or input dataset at 1042. Each of the different feature vectors may be generated by the NN from inputs that have known labels. Similarly, the NN may be provided with feature vectors that correspond to inputs having known labeling or classification. The NN then predicts a label or classification for the feature or input at 1043. The predicted label or class is compared to the known label or class (also known as ground truth) and a loss function measures the total error between the predictions and ground truth over all the training samples at 1044. By way of example and not by way of limitation the loss function may be a cross entropy loss function, quadratic cost, triplet contrastive function, exponential cost, etc. Multiple different loss functions may be used depending on the purpose. By way of example and not by way of limitation, for training classifiers a cross entropy loss function may be used whereas for learning pre-trained embedding a triplet contrastive function may be employed. The NN is then optimized and trained, using the result of the loss function and using known methods of training for neural networks such as backpropagation with adaptive gradient descent etc., as indicated at 1045. In each training epoch, the optimizer tries to choose the model parameters (i.e., weights) that minimize the training loss function (i.e., total error). Data is partitioned into training, validation, and test samples.

During training, the Optimizer minimizes the loss function on the training samples. After each training epoch, the model is evaluated on the validation sample by computing the validation loss and accuracy. If there is no significant change, training can be stopped and the resulting trained model may be used to predict the labels of the test data.

Thus, the neural network may be trained from inputs having known labels or classifications to identify and classify those inputs. Similarly, a NN may be trained using the described method to generate a feature vector from inputs having a known label or classification. While the above discussion is relation to RNNs and CRNNS the discussions may be applied to NNs that do not include Recurrent or hidden layers.

Hybrid Sensor

FIG. 11A is a diagram depicting a hybrid DVS having multiple co-located sensor types according to aspects of the present disclosure. In some implementations a hybrid DVS may be used to combine multiple sensor types into one device. The multiple sensor types may be for example and without limitation DVS infra-red light sensitive elements, DVS visible light sensitive elements, DVS wavelength specific light sensitive elements, visible light Camera pixels, Infra-red Camera pixels, DTOF Camera pixels. A first sensor type 1102 may be interspersed with a second sensor type 1102 on the same array 1101. For example, and without limitation DVS visible light sensitive elements 1103 may surround a visible light camera pixel 1102, or DVS infrared sensitive elements 1103 may surround a DVS visible light sensitive element 1102 or visible light camera pixels 1103 may surround DVS infra-red sensitive elements 1102 or any combination thereof. While a single element 1102 is shown surrounded by other elements 1103 aspects of the present disclosure are not so limited. The single element may comprise a cluster of multiple DVS light sensitive elements or camera pixels for example and without limitation a cluster of four camera pixels may be surrounded by eight DVS light sensitive elements or one camera pixel may be surrounded by eight pairs, triplets or quadruplets of DVS light sensitive elements.

Additionally, as shown in FIG. 11B a hybrid DVS may have multiple sensor types arranged in a checkerboard pattern in the array. Here blocks of a first sensor type 1102 are evenly distributed with blocks of a second sensor type 1103. Each of the first sensor type 1102 and second sensor type 1103 may be different. For example, and without limitation the first sensor type 1102 may be an DVS infra-red light sensitive element and the second sensor type 1103 may be a DVS visible light sensitive element.

Alternatively, differentiation of sensor types may be performed by filtering. In these implementations one or more filters selectively transmit light to light sensitive element located behind the one or more filters. The one or more filters may selectively transmit, for example and without limitation, a certain wavelength or wavelengths of light or a certain light polarization. The one or more filters may also selectively block a certain wavelength or wavelengths of light or a certain light polarization. The light sensitive elements behind the one or more filters may be configured for use as different sensor types. For example, and without limitation an infrared pass filter, which allows only infrared light to pass 1102 may cover one or more sensor elements in the array 1101 and other sensor elements may be unfiltered or may be infra-red cut filters 1103. In another alternative implementation the one or more filters may for example and without limitation be an optical notch filter allowing only a certain wavelength of light to pass 1102 while the other filters may block that particular wavelength while allowing others to pass 1103. This filtering may allow use of wavelengths for illuminator light for DTOF and specific wavelengths for DVS light sensitive elements thus reducing the likelihood of erroneous light source detection. Here the sensor elements may be DVS light sensitive elements of any type or camera pixels of any type.

Patterned sensor or filter elements may be incorporated into hybrid imaging units, e.g., as shown in FIG. 11C and FIG. 11D. FIG. 11C illustrates one example of a hybrid DVS imaging unit 1112C having one or more lens elements 1114, an optional microlens array 1116, a bandpass filter 1118 and a patterned hybrid sensor array 1120. The sensor array includes DVS sensor elements 1122 and conventional imaging sensor elements 1124, which may be arranged in a pattern, e.g., as depicted in FIG. 11A or FIG. 11B. Such imaging units may be used in conjunction with illumination units (not shown) in a DTOF sensor. The hybrid DVS imaging unit 1112D shown in FIG. 11D has a DVS sensor array 1126 and patterned filter element 1118 with bandpass regions 1118A and band cut regions 1118B arranged in a pattern, e.g., as depicted in FIG. 11A or FIG. 11B.

Figure 12:
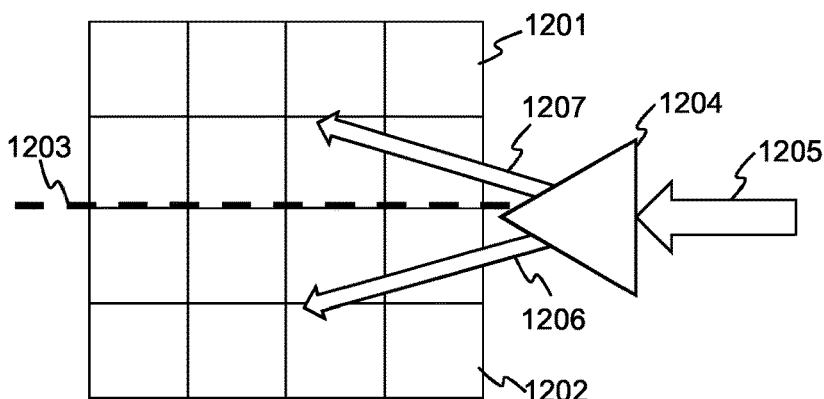
FIG. 12 is a diagram showing a hybrid DVS with multiple sensor types having inputs separated with a light separator according to aspects of the present disclosure.

FIG. 12 is a diagram showing a hybrid DVS with multiple sensor types having inputs separated with a light separator according to aspects of the present disclosure. In this implementation the light separator 1204 may filter light based on wavelength; the array 1201 may include multiple sensor element types physically separated based on the wavelength or polarization of light desired to be detected. For example, and without limitation unpolarized white light 1205 (which is a mixture of at least all visible wavelengths of light and in most cases includes some infrared wavelengths) may enter the light separator 1204, which may be a dispersing prism, diffraction grating, or dichroic mirror or the like. As shown the white light 1205 entering the light separator 1204 may be separated by wavelength or polarization with some light 1206 incident to a first portion of the array 1202 while other light 1207 is incident to a second portion of the array 1203. Here, the light separator 1204 may be thought of as a filter which changes the angle of diffraction based on wavelength or polarization. While the array shown depicts the array as a single unit with a hard separation line 1203, aspects of the present disclosure are not so limited. A first portion of the array 1201 may have up to a millimeter of separation between the second portion of the array 1202 and though the arrays are shown as separated top from bottom, other implementations may have horizontally, diagonally or circumferentially separated portions. Additionally, the light separator here may be combined with different filtering or different sensor configurations, e.g., as shown in FIGS. 11A and 11B to provide additional light wavelength separation for different sensor types.

Figure 13:
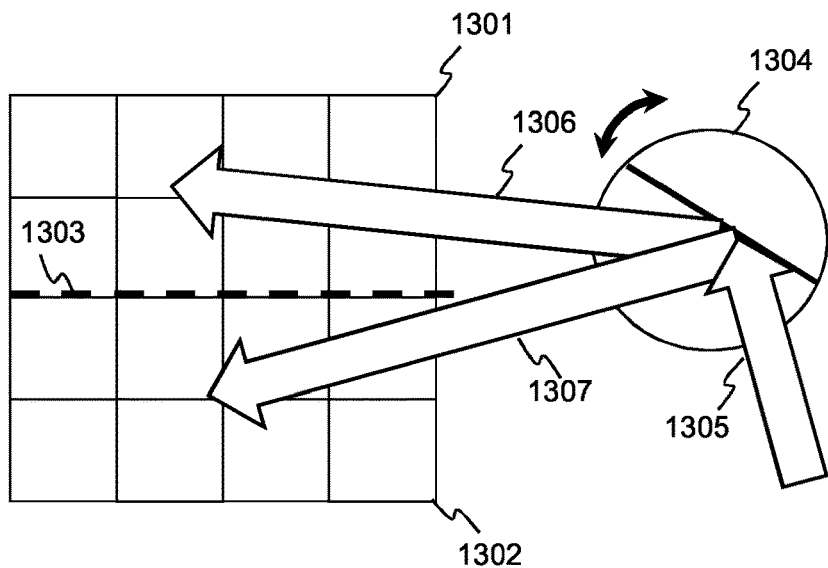
FIG. 13 is a diagram depicting a hybrid DVS with multiple sensor types having inputs separated by a microelectromechanical (MEMS) mirror according to aspects of the present disclosure.

FIG. 13 is a diagram depicting a hybrid DVS with multiple sensor types having inputs separated by a microelectromechanical (MEMS) mirror according to aspects of the present disclosure. Here a MEMS mirror 1304 may oscillate between different positions at set times to reflect light to a first portion 1301 or a second portion 1302 of the array depending on the time the light 1305 arrives at the MEMS mirror 1304. The first portion 1301 and second portion 1302 of the array may be physically separated 1303 from one another based on the incident angle of the light reflected by the MEMS mirror 1304. In this way light may be temporally filtered between the different sensor types. Such temporal filtering may be timed in accordance with a known pattern of flashing of light sources on a controller or headset. For example and without limitation, the light sources on a controller or headset may be turned on for a predetermined duration at a certain interval. For example the light sources may be turned on for 60 microseconds every 100 microseconds. In such a case, the MEMS mirror 1304 may be synchronized to reflect light 1305 to a DVS portion of the array 1301 for greater than 60 microseconds every 100 microseconds or less to capture changes in the light sources. The other reflected light 1307 is detected by the second portion of the array 1302 during times when the light sources are off and may capture ambient light for image tracking or DTOF.

Alternatively, the MEMS mirror 1304 may filter light 1305 based on wavelength. The MEMS mirror in these implementations may be, for example and without limitation a MEMS Fabry-Perot filter or diffraction grating. The MEMS mirror may diffract light of a first wavelength range 1306 to at least a first portion 1301 of the array or diffract light of a second wavelength range 1307 to a second portion of the array 1302.

Figure 14:
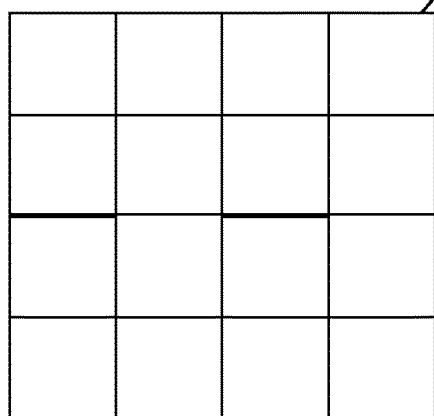
FIG. 14 is a diagram showing a hybrid DVS with multiple sensor types having inputs filtered temporally according to aspects of the present disclosure.

FIG. 14 is a diagram showing a hybrid DVS with multiple sensor types having inputs filtered temporally according to aspects of the present disclosure. Here, a filter selectively allows light to pass to the array based on time. In some implementations the filter may be an optical waveguide. At a first time step the filter may allow a first wavelength or polarization of light through to the array 1401 and may block a second wavelength or polarization of light or other wavelengths or polarizations. At a second time step the filter may allow a second wavelength or polarization 1402 but block the first wavelength or polarization of light or other wavelengths polarizations. In this way light may be temporally filtered which may be useful for tracking with different sensor types. For example and without limitation, the light sources coupled to the controller or headset may be infrared light or have a specific wavelength. The light sources may be configured to turn on and off at a particular interval. The particular interval at which the light sources turn on and off may be a sequence or a coded pattern. The temporal filtering may activate to allow the specific wavelength to pass to the sensor and block other wavelengths during the particular interval. Additionally the switching interval of the filtering may be longer than the particular interval of light sources to account for the travel time of the light to the sensor.

Body Tracking

Figure 15:
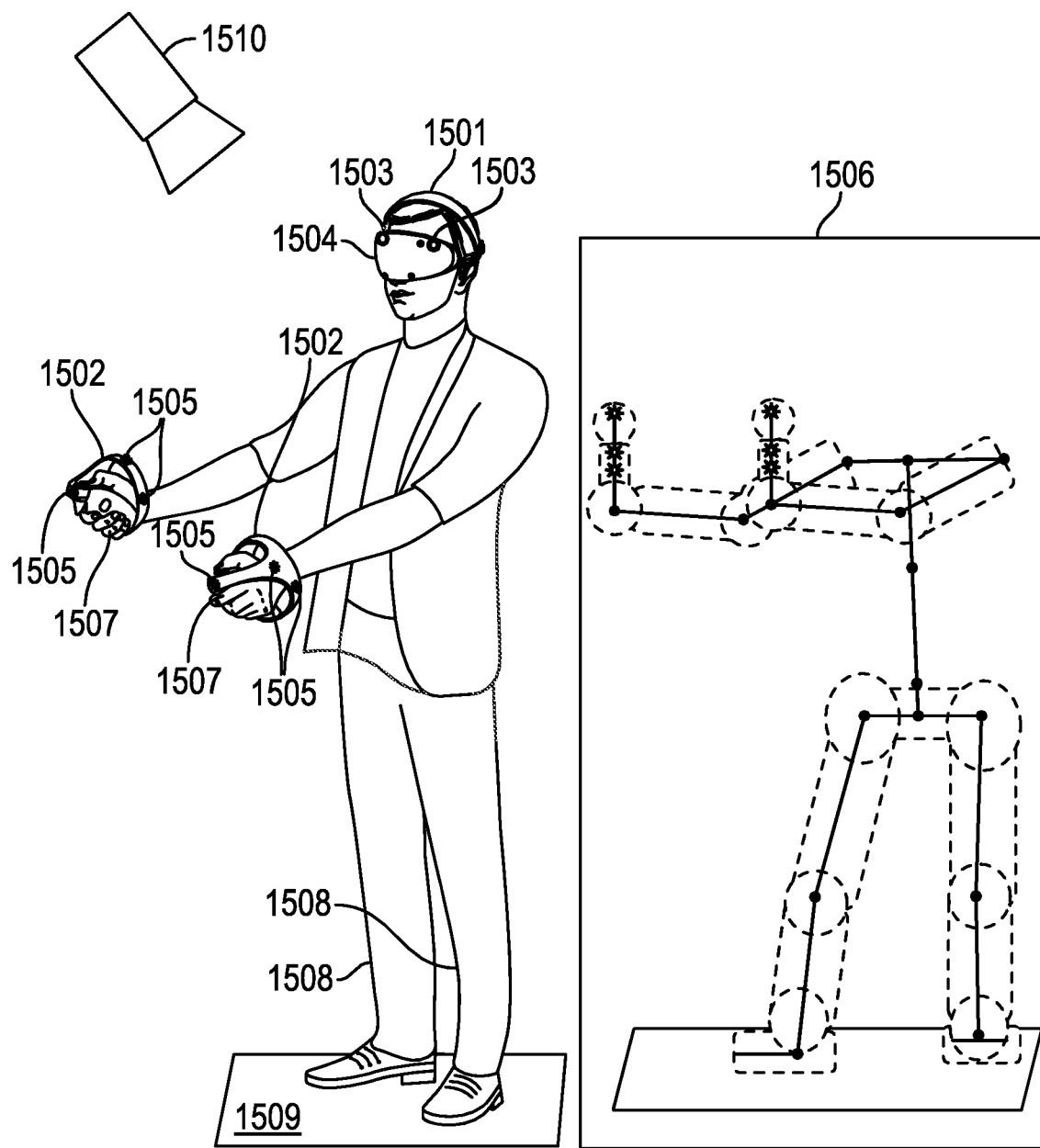
FIG. 15 is a diagram depicting body tracking with a DVS according to aspects of the present disclosure.

FIG. 15 is a diagram depicting body tracking with a DVS according to aspects of the present disclosure. As shown a user 1501 may wear a headset 1504 having a DVS 1503. Here, the DVS is depicted with two arrays or DVS units or a camera and a DVS. The user 1501 is holding two controllers 1502 having two or more light sources 1505. The DVS 1503 has the controllers 1502 with their corresponding light sources 1505 within its field of view (FOV). Additionally, the DVS 1503 may have appendages of the user such as the user's hands or arms 1507, or legs or feet 1508 within its FOV. The DVS may also have the ground or other landmarks 1509 in its FOV. For example, and without limitation the light sensitive elements of the DVS may detect reflections of light corresponding to the user's appendages or the ground or other landmarks when the user moves or the light changes. The camera detects light reflections from the field of view at the camera's frame rate. From the detected light reflections, the user's appendages or the ground or landmarks may be determined 1506. In some alternative implementation an external DVS 1510 may be used to track the user's appendages. The external DVS 1510 may be a distance away from the user chosen such that the user's appendages fit within the field of view of the external DVS 1510. For example and without limitation the external DVS 1510 may be located on top of or underneath a television or computer monitor or other free-standing or wall mounted display.

A machine learning algorithm trained to determine the user's body, appendages, the ground or landmarks and their relative position and orientation from data, such as events or frames. The machine learning algorithm may be a neural network and training may be similar to the method discussed in the general neural network training section in FIGS. 10A-10D above. A training set including labeled events or frames, or both may be used to train a neural network. The labeled events or frames or both may include for example and without limitation the labels for the user's body, appendages, the ground, landmarks, and relative position and orientation of the user's body, appendages, the ground, and landmarks. Determination of the user's body, appendages, the ground or landmarks and their relative position and orientation may be performed in addition to the position and orientation determination of the controller 1502 e.g., using SLAM. Alternatively, the position and orientation of the controller may be determined with the same trained neural network that determines labels for the user's body, appendages, the ground or landmarks and their relative position and orientation. As shown by element 1506, a model may be fit to the determined user's body and appendages to improve the determination of relative position and location.

Safety Shutter

Figure 16A:
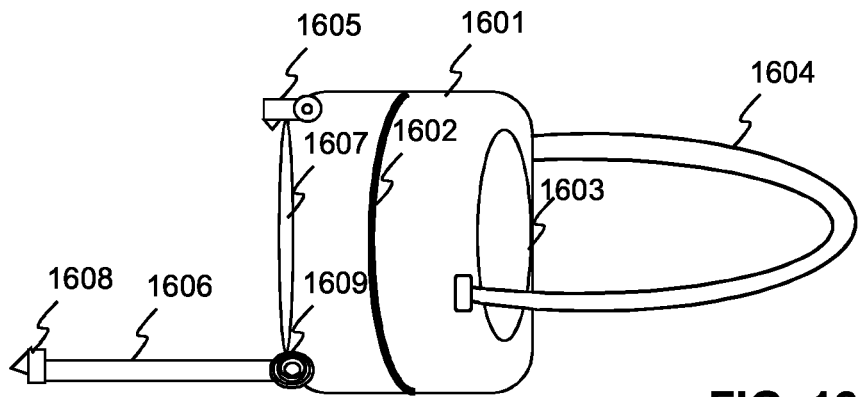
FIG. 16A is a diagram depicting a headset with a safety shutter door according to aspects of the present disclosure.

Body tracking in conjunction with determination of controller position and orientation as discussed above may be used to trigger a safety shutter in a VR or AR headset. FIG. 16A depicts a headset with a safety shutter door according to aspects of the present disclosure. The headset 1601 may include head strap 1604, an eyepiece 1603 and a display screen 1602. The eyepiece 1603 may include one or more lenses configured to focus on the display screen 1602. The one or more lenses may be for example Fresnel lenses or prescription lenses. The display screen 1602 may be transparent, a hole 1607 in the body of the headset may allow vision through the display screen 1602 when the safety shutter is open.

In this implementation, the safety shutter 1606 is a door that swings away from the hole 1607 when the safety system is activated. Here, a system operated clasp 1605 interacts with a clasp 1608 on the safety shutter door 1606 to secure the door closed over the hole 1607. A spring-loaded hinge 1609 may ensure that safety shutter door 1606 opens quickly when the system operated clasp 1605 opens. The spring-loaded hinge may for example and without limitation have a clock-type spring wound around hinge and secured to the door, the spring is wound when the door is closed and unwinds when the door opens. Alternatively, a flat spring may push against the safety shutter door 1606 when the door is closed.

The system operated clasp 1605 may be configured to open the clasp when the safety system is activated. The safety system operated clasp 1605 may include an electric motor or linear actuator that moves the clasp. The safety system may activate when the ground or one or more landmarks are detected near the system, user, user's body, or an appendage of the user. The safety system may use the determination of the user's body, appendages, the ground or landmarks and their relative position and orientation as discussed above. Upon activation of the safety system a signal may be sent to the safety system operated clasp 1605 to open the clasp. When the clasp opens the spring-loaded hinge 1609 pushes the safety shutter door 1606 open allowing the user to see through the display 1602 and avoid the danger that set off the safety system.

Figure 16B:
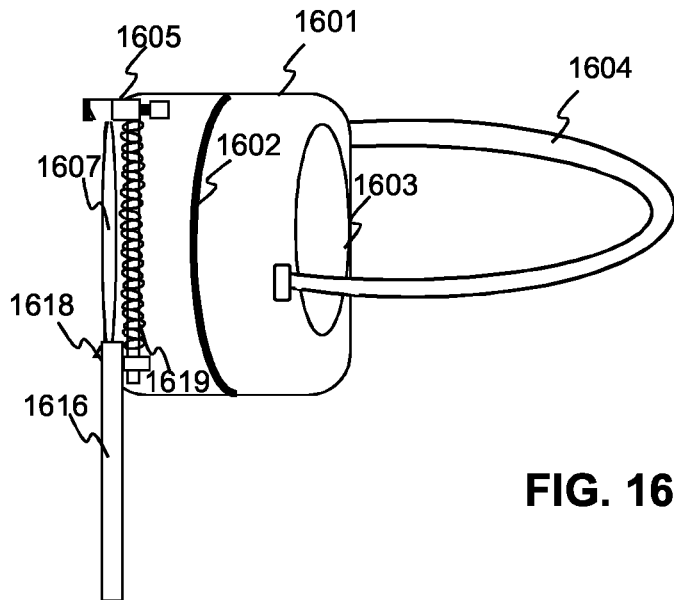
FIG. 16B is a diagram showing a headset with a sliding safety shutter according to aspects of the present disclosure.

Other safety shutter implementations may be used. For Example, FIG. 16B shows an alternative headset with a sliding safety shutter according to aspects of the present disclosure. Here the safety shutter slide 1616 slides out of the way of the hole 1607 when the safety system is activated. The safety shutter slide 1616 may run on spring-loaded rails 1619. Alternatively, the sliding safety shutter 1616 may include a tab that runs in a slot 1619 in the body of the headset, a spring also in the slot may push against the sliding safety shutter. In some additional alternative implementations, the spring may be omitted, and gravity may operate the sliding safety shutter 1616. The spring-loaded rails 1619 may push against sliding safety shutter 1616 when the shutter is closed and ensure that the safety shutter quickly opens when the safety system is activated. The system operated clasp 1605 interacts with a clasp 1618 on the sliding safety shutter 1616 to secure the slide closed.

The safety system may activate when the ground or one or more landmarks are detected near the system, user, user's body, or an appendage of the user. The safety system may use the determination of the user's body, appendages, the ground or landmarks and their relative position and orientation as discussed above. Upon activation of the safety system a signal may be sent to system operated clasp 1605 to open the clasp. When the clasp opens the spring 1619 pushes the sliding safety shutter 1616 open allowing the user to see through the display 1602 and avoid the danger that set off the safety system.

Figure 16C:
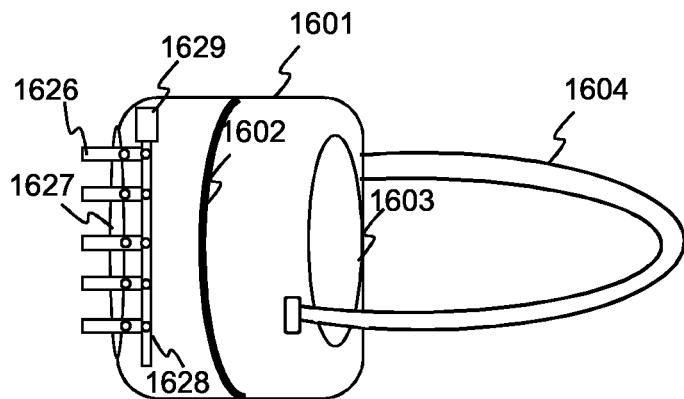
FIG. 16C is a diagram depicting a headset with a louvered safety shutter according to aspects of the present disclosure.

FIG. 16C depicts a headset with a louvered safety shutter according to aspects of the present disclosure. In this implementation the slats of the louvered safety shutter 1626 are longer in a first dimension than in a second dimension. In the closed position, the longer dimension of the slats is roughly parallel with the optics and each slat overlaps either another slat or the headset body, blocking light through the display screen 1602. In the open position the slats change position such that the shorter dimension is parallel to the optics 1603 allowing light to pass through the slats to the display screen. An actuator rod 1628 may connect each of the slats 1626 with a hinge. A safety-system controlled actuator 1629 may push or pull the actuator rod 1628 to open the louvered safety shutter when the safety system is activated. In some other implementations the safety system-controlled actuator may be spring loaded, a clasp connected to the actuator rod 1628 and the system controlled actuator 1629 may include a clasp that interfaces with the clasp of the actuator rod. The clasp of the system-controlled actuator may open when the safety system is activated allowing the actuator rod to move under spring pressure, opening the louvers.

The safety system may activate when the ground or one or more landmarks are detected near the system, user, user's body, or an appendage of the user. The safety system may use the determination of the user's body, appendages, the ground or landmarks and their relative position and orientation as discussed above. Upon activation a signal may be sent to system operated actuator to move the actuator rods. When the actuator rod 1629 moves, it pushes the slats of the louvered safety shutter 1626 open allowing the user to see through the display 1602 and avoid the danger that set off the safety system.

Figure 16D:
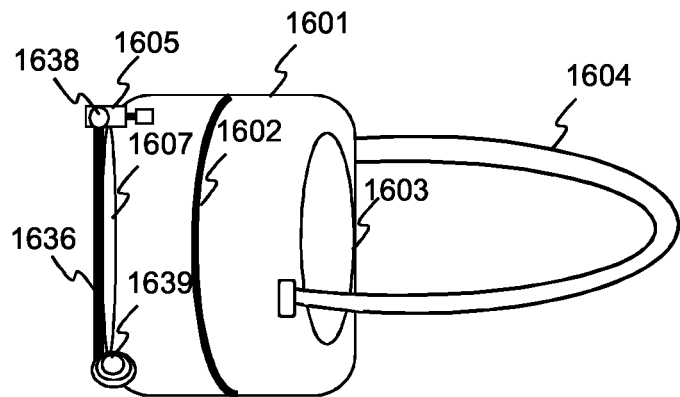
FIG. 16D is a diagram showing a headset with a fabric safety shutter according to aspects of the present disclosure.

FIG. 16D shows a fabric safety shutter according to aspects of the present disclosure. In this implementation the safety shutter 1636 is composed of an opaque fabric, for example and without limitation, tightly woven cotton fabric, polyester, vinyl, or tightly woven wool fabric. The fabric safety shutter 1636 may be coupled to a fabric roller 1639. The fabric roller 1639 may be configured to roll up the fabric shutter when the safety system is activated. The fabric roller may be for example and without limitation spring loaded using a clock spring such that when the safety shutter is closed the clock spring is under tension, alternatively an electric motor may be used to roll up the fabric safety shutter. A system operated clasp 1605 may interface with a clasp 1638 coupled to the fabric safety shutter 1636 and ensure that the fabric safety shutter does not unintentionally open.

During operation, the fabric safety shutter may be in a closed position. The safety system may activate when the ground or one or more landmarks are detected near the system, user, user's body, or an appendage of the user. The safety system may use the determination of the user's body, appendages, the ground or landmarks and their relative position and orientation as discussed above. Upon activation of the safety system a signal may be sent to system operated clasp 1605 to open the clasp. When the clasp opens the fabric roller 1619, rolls up the fabric safety shutter 1616 allowing the user to see through the display 1602 and avoid the danger that set off the safety system.

Figure 16E:
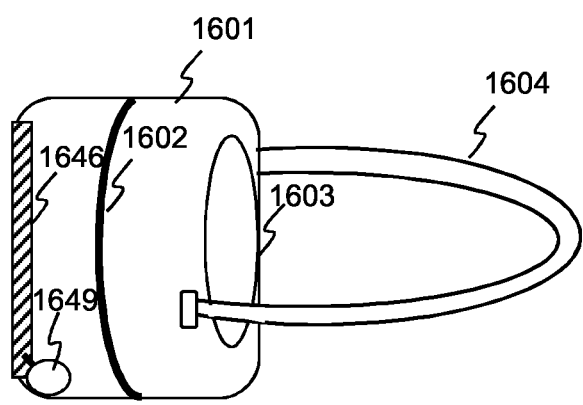
FIG. 16E is a diagram showing a headset with a liquid crystal safety shutter according to aspects of the present disclosure.

FIG. 16E shows a headset with a liquid crystal safety shutter according to aspects of the present disclosure. In this implementation a liquid crystal screen 1646 is integrated into the headset 1601 otherwise covering a hole in the headset. A safety system controlled liquid crystal screen driver 1649 is communicatively coupled to the liquid crystal screen 1646.

The liquid crystal screen 1646 may be for example and without limitation a liquid crystal shutter having a first light polarizer and a second light polarizer wherein the first polarizer has a 90-degree light polarization difference from the second light polarizer and a fluid filled cavity. The fluid filled cavity may include liquid crystals that are configured to have a first orientation in the absence of an electric field that changes light polarization allowing light to pass from the first light polarizer through the second light polarizer. The liquid crystals may be further configured to align in a second orientation under an electric field. The second orientation of the liquid crystals do not change the polarization of light thus the light that passes through the first light polarizer is blocked at the second light polarizer. Electrodes may be disposed along a surface of the liquid filled cavity allowing control of the liquid crystals. The safety system controlled liquid crystal screen driver may be communicatively coupled with the electrodes allowing control of the liquid crystals in the fluid filled cavity. As used herein communicatively coupled means capable of sending and/or receiving electric signals representing a message or instructions from one coupled element to the other coupled element, the signals may travel through intermediary elements and their format may change but the message contained therein remains unchanged.

During operation, the safety system-controlled driver 1649 may send signals to the liquid crystal screen 1646 causing the liquid crystal safety shutter 1646 to go opaque while the display screen 1602 is active. When the safety system is activated the driver 1649 may cause the liquid crystal safety shutter 1646 to go transparent. For example, and without limitation, the driver may reduce voltage supplied to the liquid crystal safety shutter, returning the liquid crystals to their first orientation which causes a change in the polarization of light allowing light to pass through the second light polarizer. The safety system may activate when the ground or one or more landmarks are detected near the system, user, user's body, or an appendage of the user. The safety system may use the determination of the user's body, appendages, the ground or landmarks and their relative position and orientation as discussed above.

Finger Position Tracking

Figure 17:
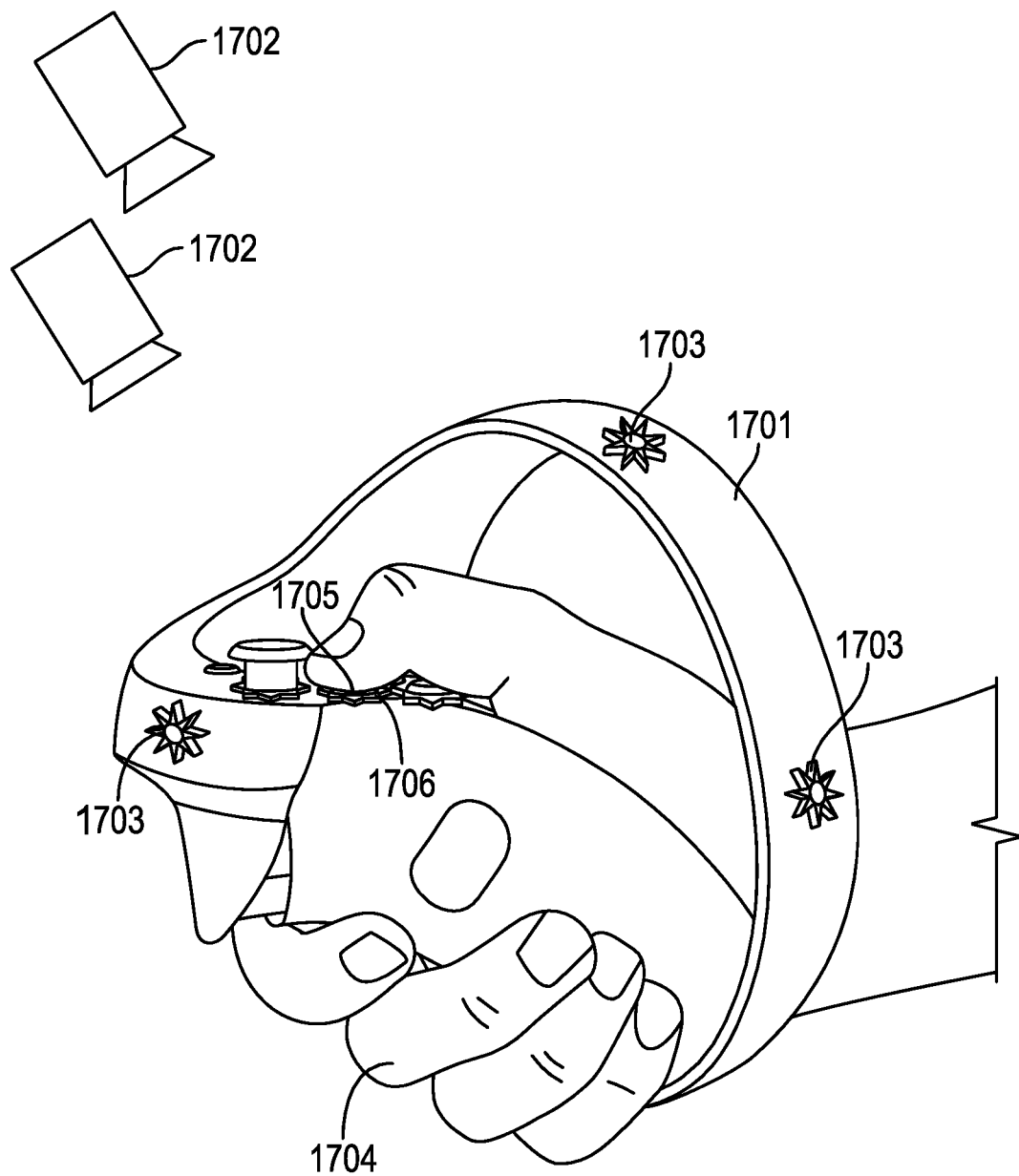
FIG. 17 is a diagram depicting finger tracking with a DVS and controller according to aspects of the present disclosure.

Aspects of the present disclosure may be applied to finger tracking. FIG. 17 depicts finger tracking with a DVS and controller according to aspects of the present disclosure. Here a controller 1701 includes two or more light sources and one or more buttons 1705. The two or more light sources include one or more light sources 1706 proximate to the one or more buttons 1705 and two or more other tracking light sources 1703. As discussed above the two or more other tracking light sources 1703 may generate events at the DVS 1702 that are used to determine the position and orientation of the controller 1701. Shown here two DVS 1702 or a DVS with two arrays and three other tracking light sources 1703 are used for determination of the position and orientation of the controller.

The one or more light sources 1706 proximate to the one or more buttons 1705 may be used for finger tracking. For example and without limitation, finger tracking may be accomplished with the DVS 1702 using occlusion of the one or more light sources 1706 proximate to the buttons 1705. The one or more light sources 1706 proximate to the buttons may turn off and on at a predetermined interval. The DVS 1702 may generate an event with each flash. The events may be analyzed to determine occlusion of the one or more light sources 1706 proximate to the buttons 1705. The configuration of the one or more light sources proximate to the buttons may be known and thus when a light source is occluded by for example and without limitation a finger or palm, the pattern of light detected in events generated by the DVS is different than when the light source is not occluded. As discussed above with respect to determination of the position and orientation of the controller, here the timing of the flashes may be used to determine which lights are occluded and therefore determine corresponding finger or palm position. When a light source 1706 proximate to a button 1705 has a reduced intensity or no intensity during the interval the light sources proximate to the buttons are known to be 'on'. That light source is determined to be occluded. Similarly, when a light known to be 'on' changes in detected intensity; an event may be generated and from the event it may be determined that the user's finger or hand has moved and the button has become unconcluded. The occlusion of one or more of the light sources proximate to the one or more buttons may be correlated to finger or palm positions based on their location. For example and without limitation, a light source located near the palm of the user when the controller 1701 is held may be used to determine the location of the user's hand 1704.

The light sources 1706 may be located around each button 1705 and the button configuration of the controller and the design may be used to determine finger position. For example and without limitation, the controller 1701 may be designed such that, when held, each finger of the user is position near a button 1705. The pattern of light source occlusion determined from DVS events may then be used to determine when a user's finger is hovering over a button that has not been activated and also may be used to determine when a user's finger has moved past a button. This may be useful to provide further interaction options for users, such as having a half button press or semi press or other button options. Multiple light sources may surround each button allowing for a refined determination of the position of the user's fingers or palm. For example, and without limitation in some implementations, ten or more light sources may surround each button, in other implementations a single light source may shine light through a translucent diffuser around the button and the interruption in the diffuse light profile may be used to determine finger position.

In some implementations, the button itself 1705 may also be a light source. The one or more buttons 1705 may turn off and on at a different interval than the one or more light sources proximate 1706 to the button or the other light tracking light sources 1703. Alternatively, the light source of the button 1705 may have a different wavelength or polarization than the one or more light sources proximate 1706 or the other light tracking light sources 1703.

The buttons and tracking may also be used to enable a power saving mode for the light sources. For example, when a button is determined to be pressed, the one or more light sources proximate to that button may be dimmed or turned off. Additionally, if the controller 1701 is determined to be out of view of the DVS 1702, the one or more lights proximate to the buttons may be dimmed or turned off. In some implementation Data from the IMU may be used to determine if the controller is being held by a user for example and without limitation, if a change in an IMU data such as acceleration, angular rate etc. is not detected for a threshold period of time then the light sources may be dimmed or turned off. Once a change in IMU data is detected the light sources may be turned back on.

In an alternative implementation finger tracking may be performed without the use of one or more light sources. A machine learning model may be trained with a machine learning algorithm to detect finger position from events generated from ambient light changes due to finger movement. The machine learning model may be a general machine learning model such as a CNN, RNN or DNN as discussed above. In some implementations specialized machine learning model such as for example and without limitation a spiking (or sparking) neural network (SNN) may be trained with a specialized machine learning algorithm. An SNN mimics biological NNs by having an activation threshold and a weight that is adjusted according to a relative spike time within an interval, also known as Spike-timing-dependent-plasticity (STDP). When the activation threshold is achieved the SNN is said to spike and transmit its weight to the next layer. An SNN may be trained via STDP and supervised or unsupervised learning techniques. and More information about SNNs can be found in Tavanaei, Amirhossein et al. "Deep Learning in Spiking Neural Networks" Neural Networks (2018) arXiv:1804.08150, the contents of which are incorporated herein by reference for all purposes.

Alternatively, a high dynamic range (HDR) image may be constructed using aggregated events from ambient data. A machine learning model trained to recognize hand position or controller position and orientation from HDR images. The trained machine learning model may be applied to HDR images generated from the events to determine the hand/finger position or controller position and orientation. The machine learning model may be a general machine learning model trained with supervised learning techniques as discussed in the general neural network training section.

Eye Tracking

Aspects of the present disclosure may be applied to eye tracking. Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on a relative location of the pupils in the image.

Two common gaze tracking techniques for determining eye gaze direction based on pupil location are known as Bright Pupil tracking and Dark Pupil tracking. Bright Pupil tracking involves illumination of the eyes with a light source that is substantially in line with the optical axis of the DVS, causing the emitted light to be reflected off of the retina and back to the DVS through the pupil. The pupil presents in the image as an identifiable bright spot at the location of the pupil, similar to the red eye effect which occurs in images during conventional flash photography. In this method of gaze tracking, the bright reflection from pupil itself helps the system locate the pupil if contrast between pupil and iris is not enough.

Dark Pupil tracking involves illumination with a light source that is substantially offline from the optical axis of the DVS, causing light directed through the pupil to be reflected away from the optical axis of the DVS, resulting in an identifiable dark spot in the Event at the location of the pupil. In alternative Dark Pupil tracking systems, an infrared light source and cameras directed at eyes can look at corneal reflections. Such DVS based systems track the location of the pupil and corneal reflections which provides parallax due to different depths of reflections gives additional accuracy.

Figure 18A:
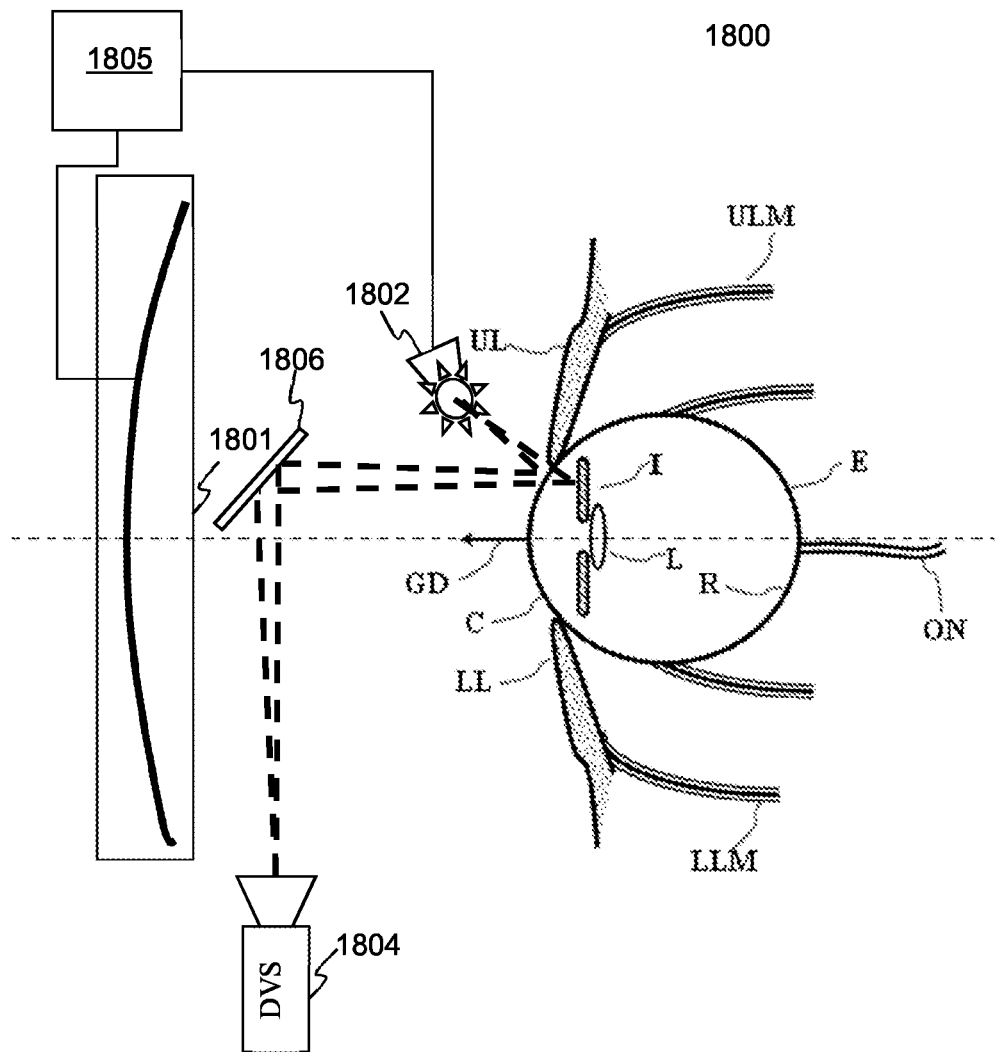
FIGS. 18A-18B are schematic diagrams illustrating gaze tracking within the context of aspects of the present disclosure.

FIG. 18A depicts an example of a dark pupil gaze tracking system 1800 that may be used in the context of the present disclosure. The gaze tracking system tracks the orientation of a user's eye E relative to a display screen 1801 on which visible images are presented. While a display screen is utilized in the example system of FIG. 18A, certain alternative embodiments may utilize an image projection system capable of projecting images directly into the eyes of a user. In these embodiments, the user's eye E would be tracked relative to the images projected into the user's eyes. In the example of FIG. 18A, the eye E gathers light from the screen 1801 through a variable iris I and a lens L projects an image on the retina R. The opening in the iris is known as the pupil. Muscles control rotation of the eye E in response to nerve impulses from the brain. Upper and lower eyelid muscles ULM, LLM respectively control upper and lower eyelids UL,LL in response to other nerve impulses.

Light sensitive cells on the retina R generate electrical impulses that are sent to the user's brain (not shown) via the optic nerve ON. The visual cortex of the brain interprets the impulses. Not all portions of the retina R are equally sensitive to light. Specifically, light-sensitive cells are concentrated in an area known as the fovea.

The illustrated image tracking system includes one or more infrared light sources 1802, e.g., light emitting diodes (LEDs) that direct non-visible light (e.g., infrared light) toward the eye E. Part of the non-visible light reflects from the cornea C of the eye and part reflects from the iris. The reflected non-visible light is directed toward a DVS 1804 sensitive to infrared light by a wavelength-selective mirror 1806. The mirror transmits visible light from the screen 1801 but reflects the non-visible light reflected from the eye.

The DVS 1804 produces an event of the eye E which may be analyzed to determine a gaze direction GD from the relative position of the pupil. This event may be produced with a processor 1805. The DVS 1804 is advantageous in this implementation as the extremely fast update rate for events provides near real time information on changes in the user's gaze.

Figure 18B:
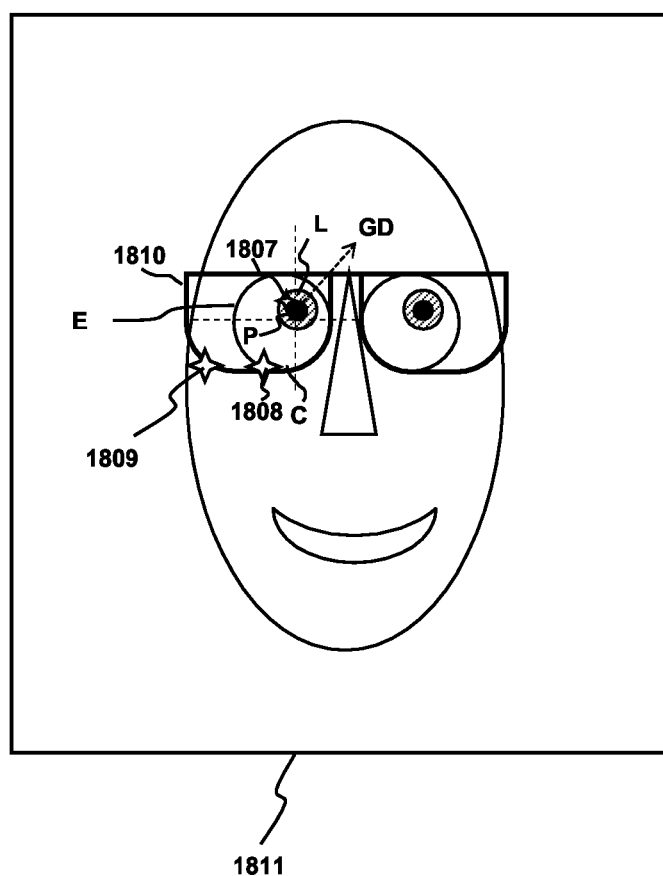

As seen in FIG. 18B, the event 1811 showing a user's head H may be analyzed to determine a gaze direction GD from the relative position of the pupil. For example, analysis may determine a 2-dimensional offset of the pupil P from a center of the eye E in the image. The location of the pupil relative to the center may be converted to a gaze direction relative to the screen 1801, by a straightforward geometric computation of a three-dimensional vector based on the known size and shape of the eyeball. The determined gaze direction GD is capable of showing the rotation and acceleration of the eye E as it moves relative to the screen 1801.

As also seen in FIG. 18B, the event may also include reflections 1807 and 1808 of the non-visible light from the cornea C and the lens L, respectively. Since the cornea and lens are at different depths, the parallax and refractive index between the reflections may be used to provide additional accuracy in determining the gaze direction GD. An example of this type of eye tracking system is a dual Purkinje tracker, wherein the corneal reflection is the 1st Purkinje Image, and the lens reflection is the 4th Purkinje Image. There may also be reflections 1808 from a user's eyeglasses 1809, if these are worn a user.

Performance of eye tracking systems depend on a multitude of factors, including the placement of light sources (IR, visible, etc.) and DVS, whether user is wearing glasses or contacts, Headset optics, tracking system latency, rate of eye movement, shape of eye (which changes during the course of the day or can change as a result of movement), eye conditions, e.g., lazy eye, gaze stability, fixation on moving objects, scene being presented to user, and user head motion. The DVS provides an extremely fast update rate for events with reduced extraneous information output to the processor. This allows for quicker processing and faster gaze tracking state and error parameter determination.

Error parameters that may be determined from gaze tracking data may include, but are not limited to, rotation velocity and prediction error, error in fixation, confidence interval regarding the current and/or future gaze position, and errors in smooth pursuit. State information regarding a user's gaze involves the discrete state of the user's eyes and/or gaze. Accordingly, example state parameters that may be determined from gaze tracking data may include, but are not limited to, blink metrics, saccade metrics, depth of field response, color blindness, gaze stability, and eye movement as a precursor to head movement.

In certain implementations, the gaze tracking error parameters can include a confidence interval regarding the current gaze position. The confidence interval can be determined by examining the rotational velocity and acceleration of a user's eye for change from last position. In alternative embodiments, the gaze tracking error and/or state parameters can include a prediction of future gaze position. The future gaze position can be determined by examining the rotational velocity and acceleration of eye and extrapolating the possible future positions of the user's eye. In general terms, the DVS update rate of the gaze tracking system may lead to a small error between the determined future position and the actual future position for a user with larger values of rotational velocity and acceleration because the updated rate of the DVS is so high this small error may be significantly less than existing camera based systems.

In yet further alternative implementations, the gaze tracking error parameters can include a measurement of the eye speed, e.g., the rotation rate. In certain alternative embodiments, the determined gaze tracking state parameters include measuring the metrics of a user's blink. During a typical blink, a period of 150 milliseconds (ms) typically elapses wherein a user's vision is not focused on the presented images. Thus, depending on the frame rate of the display device, a user's vision may not be focused on the presented images for up to 20-30 frames. However, upon exiting the blink, the user's gaze direction may not correspond to the last measured gaze direction as determined by the obtained gaze tracking data. Accordingly, metrics of a user's gaze may be determined from the obtained gaze tracking data. These metrics may include, but are not limited to, the measured start and end times of the blink of a user as well as the predicted end times.

In yet additional alternative implementations, the determined gaze tracking state parameters include measuring the metrics of a user's saccades. During a typical saccade, a period of 20-200 ms typically elapses wherein a user's vision is not focused on the presented images. Thus, depending on the frame rate of the display device, a user's vision may not be focused on the presented images for anywhere up to 40 frames. However, as a result of the nature of a saccade, the user's gaze direction will have shifted to a different region of interest when the saccade is exited. Accordingly, gaze tracking data may be used in establishing the metrics of a user's saccade based on the actual or predicted time that will elapse during the saccade. These metrics may include, but are not limited to, the measured start and end times of the saccades of a user as well as the predicted end times.

In certain alternative implementations, the determined gaze tracking state parameters include determining a transition in the gaze direction of a user between areas of interest as a result of a change in depth of field between presented images. Because providing a transition between areas of interest in presented images will result in the user undergoing a saccade.

In yet additional alternative implementations, the determined gaze tracking state parameters may adapt for color blindness. For example, regions of interest may be present in an image presented to a user such that the regions would not be noticeable by a user who has a particular form of color blindness. The gaze tracking data obtained at would determine whether or not the user's gaze identified or responded to the area of interest, for example, as a result of the user's changed gaze direction. Accordingly, it may be determined, as a gaze tracking error parameter, whether or not a user is color blind to a particular color or spectrum.

In certain alternative implementations, the determined gaze tracking state parameters include a measurement of the gaze stability of a user. Determining gaze stability may be performed by measuring the microsaccadic radius of the user's eye; smaller fixation overshoot and undershoot equates to a more stable gaze in a user.

In yet additional alternative implementations, the determined gaze tracking error and/or state parameters include a user's ability to fixate on moving objects. These parameters may include the measurement of the capability of a user's eye to undergo smooth pursuit and the maximum object pursuit speed of the eyeball. Typically, a user with excellent smooth pursuit capabilities experiences less jitter in the movement of the eyeball.

In certain alternative implementations, the determined gaze tracking error and/or state parameters include a determination of eye movement as a precursor to head movement. Offset between head and eye orientation can affect certain error and/or state parameters as discussed above, e.g., in smooth pursuit or fixation.

More information regarding gaze tracking and error parameter determination may be found in U.S. Pat. No. 10,192,528 the contents of which are incorporated by reference herein for all purposes.

System

Figure 19:
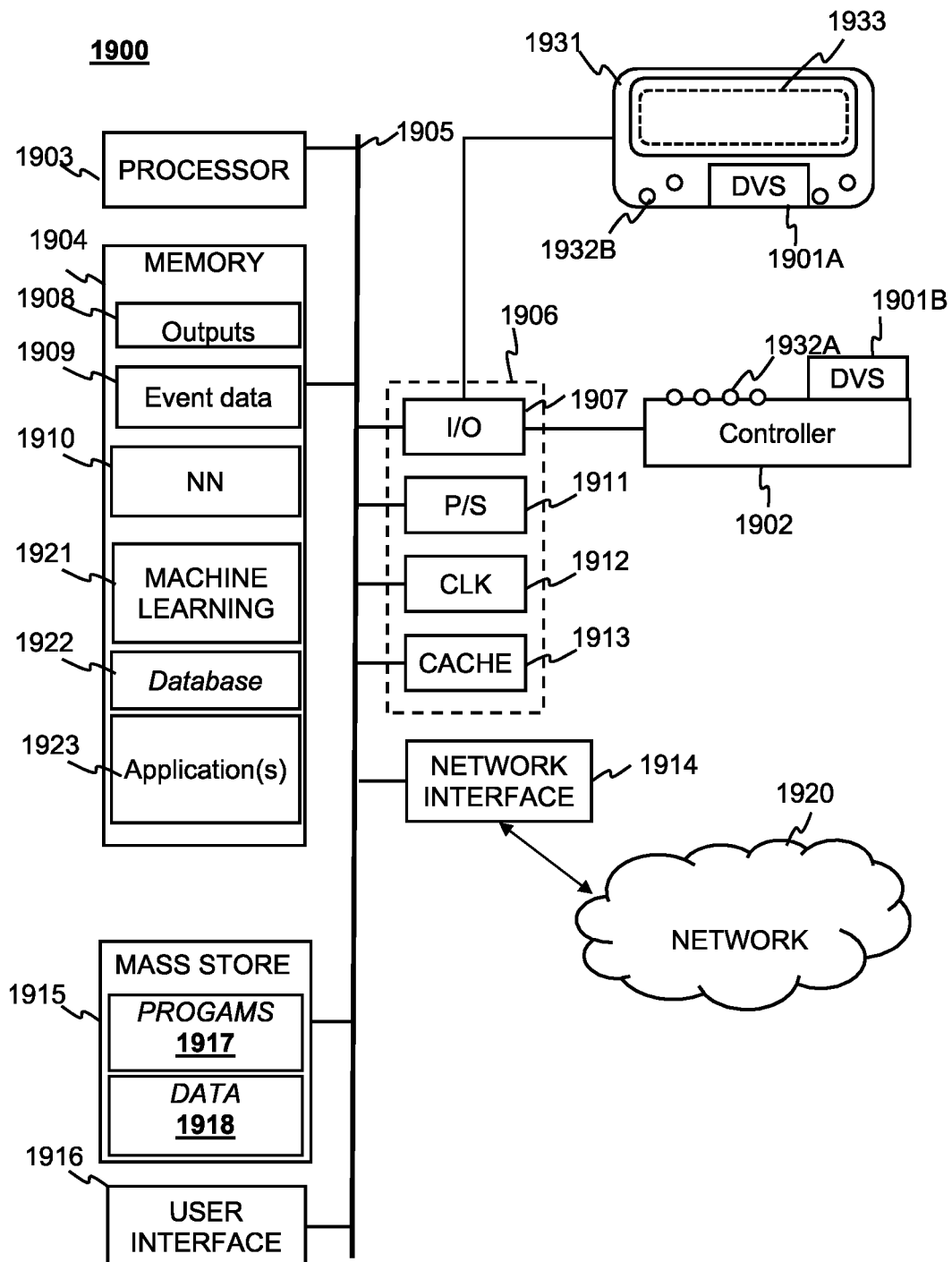
FIG. 19 is a block system diagram for a system for tracking with a DVS according to aspects of the present disclosure.

FIG. 19 is a block system diagram for a system for tracking with a DVS according to aspects of the present disclosure. By way of example, and not by way of limitation, according to aspects of the present disclosure, the system 1900 may be an embedded system, mobile phone, personal computer, tablet computer, portable game device, workstation, game console, and the like.

The system 1900 generally includes a central processor unit (CPU) 1903, and a memory 1904. The system 1900 may also include well-known support functions 1906, which may communicate with other components of the system, e.g., via a data bus 1905. Such support functions may include, but are not limited to, input/output (I/O) elements 1907, power supplies (P/S) 1911, a clock (CLK) 1912 and cache 1913.

The system 1900 may include a display device 1931 to present rendered graphics to a user. In alternative implementations, the display device is a separate component that works in conjunction with the system, 1900. The display device 1931 may be in the form of a flat panel display, head mounted display (HMD), cathode ray tube (CRT) screen, projector, or other device that can display visible text, numerals, graphical symbols, or images.

Here, the display device 1931 is coupled with a DVS 1901A and a controller 1902 includes two or more light sources 1932A, which may be in any of the configurations described herein. In alternative implementations, the DVS may be coupled to the game controller and the display device may include two or more light sources instead. In yet other alternative implementations, the DVS is a separate unit uncoupled from either the display device or the controller, the controller and display device in this case may both include two or more light sources for tracking.

In some implementations, e.g., where the display device is part of a head-mounted display (HMD), such HMD may include an inertial measurement unit (IMU), such as an accelerometer or gyroscope. As also discussed hereinabove, such an HMD may include light sources 1932B that may be tracked using a DVS that is separate from the display device 1901 and coupled to the CPU 1903. By way of example, a separate DVS 1901B may be mounted to the controller 1902.

In some implementations, the DVS 1901A or DVS 1901B may be part of a hybrid sensor, e.g., as discussed above with respect to FIG. 11A, FIG. 11B, FIG. 11C, or FIG. 11D. Such a hybrid sensor may include a depth sensor, e.g., a DTOF sensor, in which case the hybrid sensor may include an illumination unit (not shown).

Furthermore, where the display device 1931 is part of an HMD, the device may be fitted with an optional safety shutter 1933, which may be operably coupled to a processor, such as the CPU 1903, and operate as discussed above with respect to FIG. 16A, FIG. 16B, FIG. 16C, FIG. 16D or FIG. 16E. Alternatively, the safety shutter may be controlled by a separate processor mounted to the HMD.

The system 1900 includes a mass storage device 1915 such as a disk drive, CD-ROM drive, flash memory, solid state drive (SSD), tape drive, or the like to provide non-volatile storage for programs and/or data. The system 1900 may also optionally include a user interface unit 1916 to facilitate interaction between the system 1900 and a user. The user interface 1916 may include a keyboard, mouse, joystick, light pen, or other device that may be used in conjunction with a graphical user interface (GUI). The system 1900 may also include a network interface 1914 to enable the device to communicate with other devices over a network 1920. The network 1920 may be, e.g., a local area network (LAN), a wide area network such as the internet, a personal area network, such as a Bluetooth network or other type of network. These components may be implemented in hardware, software, or firmware, or some combination of two or more of these.

The CPU 1903 may each include one or more processor cores, e.g., a single core, two cores, four cores, eight cores, or more. In some implementations, the CPU 1903 may include a GPU core or multiple cores of the same Accelerated Processing Unit (APU). The memory 1904 may be in the form of an integrated circuit that provides addressable memory, e.g., random access memory (RAM), dynamic random-access memory (DRAM), synchronous dynamic random access memory (SDRAM), and the like. The main memory 1904 may include application data 1923 used by the processor 1903 while processing. The main memory 1904 may also include event data 1909 received from the DVS 1901. A trained Neural Network (NN) 1910 may be loaded into Memory 1904 for determination of position and orientation data as discussed in FIG. 9. Additionally, the Memory 1904 may include machine learning algorithms 1921 for training or adjusting the NN 1910. A database 1922 may be included in the memory 1904. The database may contain information about the light source configurations, predetermined flash intervals of each one or more light sources, and the like. The memory may also contain outputs from IMUs coupled to the controller 1902 or display device 1931. In some implementations the memory 1904 may contain outputs from the one or more light sources such time stamps when each of the light sources are on or off.

According to aspects of the present disclosure the processor 1903 may carry out methods for determining the position and orientation of a controller or user as discussed in FIGS. 8 and 9, these methods may be loaded into memory 1904 as applications 1923. The processor may generate one or more orientations and configuration of the controller, headset, user's body or appendages, the ground or a landmark as a result of carrying out the methods described in FIGS. 8 and 9 and further described with respect to FIG. 15. These positions and orientations may be held in the database 1922 and may be used in successive iteration of the methods of FIGS. 8 and 9. In some implementations, the processor 1903 may utilize such positions and/or orientations in a machine learning algorithm trained to perform simultaneous localization and mapping (SLAM).

The Mass Storage 1915 may contain Application or Programs 1917 that are loaded to the main memory 1904 when processing begins on the application 1923. Additionally, the mass storage 1915 may contain data 1918 used by the processor during processing of applications 1923, NN 1910, machine learning algorithms 1921 and filling the database 1922.

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:
- One or more processor cores (e.g., microcontroller, microprocessor, or digital signal processor (DSP) cores.
- Memory blocks, e.g., read only memory (ROM), random access memory (RAM), electrically erasable programmable read-only memory (EEPROM) and flash memory.
- Timing sources, such as oscillators or phase-locked loops.

Peripherals, such as counter-timers, real-time timers, or power-on reset generators.

External interfaces, e.g., industry standards such as universal serial bus (USB), FireWire, Ethernet, universal asynchronous receiver/transmitter (USART), serial peripheral interface (SPI) bus.

Analog interfaces including analog to digital converters (ADCs) and digital to analog converters (DACs).

Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals, and interfaces.

Aspects of the present disclosure provide for image-based tracking characterized by a higher sample rate than is possible with conventional image-based tracking systems thereby leading to improved fidelity of tracking. Additional advantages include reduced cost, reduced weight, reduced generation of extraneous data, and reduced processing requirements when using a DVS-based tracking system. Such advantages allow for improved Virtual Reality (VR) and Augmented Reality (AR) systems, among other applications.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the items following the article, except where expressly stated otherwise. The appended claims are not to be interpreted as including means-plus-function limitations, unless such a limitation is explicitly recited in a given claim using the phrase "means for."

What is claimed is:

1. A tracking system, comprising
a processor;
a controller operably coupled to the processor;
two or more light sources mounted in a known configuration with respect to each other and with respect to the controller wherein each light source of the two or more light sources is configured to turn on and off in a pattern configured to indicate its identity whereby the two or more light sources are distinguishable from each other;
a dynamic vision sensor (DVS) operably coupled to the processor, the DVS having an array of light-sensitive elements in a known configuration, wherein the dynamic vision sensor is configured to output signals corresponding to two or more events at two or more corresponding light-sensitive elements in the array in response to changes in light output from the two or more light sources, wherein the output signals include information corresponding to times of the two or more events and locations of the one or more corresponding light-sensitive elements in the array,
wherein the processor is configured to determine an association between each of the two or more events and two or more corresponding particular light sources of the two or more light sources and fit a position and orientation of the controller using the determined association, the known configuration of the two or more light sources with respect to each other and with respect to the controller body and the locations of the one or more corresponding light-sensitive elements in the array.

2. The tracking system of claim 1, wherein fitting a position and orientation of the controller includes using a machine learning model trained to fit at least the two or more events to a position and orientation of the controller.

3. The tracking system of claim 2, wherein the machine learning model is trained using artificial training data wherein the artificial training data includes at least two or more events with corresponding masked controller positions and orientations.

4. The tracking system of claim 3, wherein noise is added to the artificial training data.

5. The tracking system of claim 2, wherein the machine learning model is trained from live controller tracking and masked controller position and orientation information.

6. The tracking system of claim 2, wherein the machine learning model is further trained to predict a user hand or arm orientation and position from the two or more events.

7. The tracking system of claim 1, wherein fitting a position and orientation of the controller includes using a fitting algorithm to fit the known configuration of the two or more light sources with respect to each other and with respect to the controller to the two or more events.

8. The tracking system of claim 1, wherein the two or more light sources are configured to emit infra-red light and the light-sensitive elements of the DVS are configured to detect infra-red light.

9. A tracking system, comprising
a processor;
a dynamic vision sensor (DVS) operably coupled to the processor, the DVS having an array of light-sensitive elements in a known configuration, wherein the dynamic vision sensor is configured to output signals corresponding to two or more events at two or more corresponding light-sensitive elements in the array in response to changes in light output from two or more light sources in a known configuration with respect to each other and with respect to a controller body, wherein the output signals include information corresponding to times of the two or more events and locations of the two or more corresponding light-sensitive elements in the array, wherein each light source of the two or more light sources is configured to turn on and off in a pattern configured to indicate its identity whereby the two or more light sources are distinguishable from each other,
wherein the processor is configured to determine an association between each of the two or more events and two or more corresponding particular light sources of the two or more light sources and fit a position and orientation of at least the controller using the determined association, the known configuration of the two or more light sources with respect to each other and with respect to the controller body and the locations of the one or more corresponding light-sensitive elements in the array.

10. The tracking system of claim 9, wherein fitting a position and orientation of the controller includes using a machine learning model trained to fit at least the two or more events to a position and orientation of the two or more light sources with respect to the controller.

11. The tracking system of claim 10, wherein the machine learning model is trained using artificial training data wherein the artificial training data includes at least two or more events with corresponding masked positions and orientations of the two or more light sources with respect to the controller.

12. The tracking system of claim 11, wherein noise is added to the artificial training data.

13. The tracking system of claim 10, wherein the machine learning model is trained from live tracking data and masked position and orientations of the two or more light sources.

14. The tracking system of claim 10, wherein the machine learning model is further trained to predict a user hand or arm orientation and position from the two or more events.

15. The tracking system of claim 9, wherein fitting a position and orientation of at least the controller includes using a fitting algorithm to fit the known configuration of the two or more light sources with respect to each other and with respect to the controller to the two or more events.

16. The tracking system of claim 9, wherein the DVS is attached to a controller and the two or more light sources are mounted to the controller body.

17. A method for tracking comprising:
   detecting two or more events corresponding to changes in light output from two or more light sources with a dynamic vision system (DVS) having an array of light-sensitive elements in a known configuration, wherein each light source of the two or more light sources is configured to turn on and off in a pattern configured to indicate its identity whereby the two or more light sources are distinguishable from each other;
   determining an association between each of the two or more events and two or more corresponding light sources wherein the two or more light sources have a known configuration with respect to each other and with respect to a controller body;
   fitting a position and orientation of at least the controller using the determined association, the known configuration of the two or more light sources with respect to each other and with respect to the controller body and the locations of the one or more corresponding light-sensitive elements in the array.

18. The method of claim 17, wherein fitting a position and orientation of the controller includes using a machine learning model trained to fit at least the two or more events to a position and orientation of the controller.

19. The method of claim 18, wherein the machine learning model is trained using artificial training data wherein the artificial training data includes at least two or more events with corresponding masked controller positions and orientations.

20. The method of claim 19, wherein noise is added to the artificial training data.

21. The method of claim 17, wherein fitting a position and orientation of the controller includes using a fitting algorithm to fit the known configuration of the two or more light sources with respect to each other and with respect to the controller to the two or more events.

* * * * *